(12) United States Patent
Atwood et al.

(10) Patent No.: US 10,918,022 B2
(45) Date of Patent: Feb. 16, 2021

(54) SYSTEM AND METHOD FOR AUTOMATED PLANT TRAINING

(71) Applicant: Trella Technologies LLC, Bourne, MA (US)

(72) Inventors: Aja N. Atwood, Mashpee, MA (US); Andres Chamorro, III, Ashland, MA (US)

(73) Assignee: Trella Technologies LLC, Bourne, MA (US)

( * ) Notice: Subject to any disclaimer, the term of this patent is extended or adjusted under 35 U.S.C. 154(b) by 350 days.

(21) Appl. No.: 15/955,113

(22) Filed: Apr. 17, 2018

(65) Prior Publication Data

US 2018/0295792 A1    Oct. 18, 2018

Related U.S. Application Data

(60) Provisional application No. 62/486,528, filed on Apr. 18, 2017, provisional application No. 62/574,411, filed on Oct. 19, 2017.

(51) Int. Cl.
| | |
|---|---|
| *A01G 9/20* | (2006.01) |
| *A01G 7/00* | (2006.01) |
| *A01G 9/02* | (2018.01) |
| *A01G 9/24* | (2006.01) |
| *A01G 9/14* | (2006.01) |
| *A01G 7/04* | (2006.01) |

(Continued)

(52) U.S. Cl.
CPC ............. *A01G 9/20* (2013.01); *A01G 7/00* (2013.01); *A01G 7/045* (2013.01); *A01G 9/022* (2013.01); *A01G 9/12* (2013.01); *A01G 9/143* (2013.01); *A01G 9/24* (2013.01); *A01G 13/0212* (2013.01); *Y02A 40/25* (2018.01)

(58) Field of Classification Search
CPC . A01G 7/00; A01G 7/045; A01G 9/00; A01G 2009/003; A01G 9/02; A01G 9/022; A01G 9/12; A01G 9/126; A01G 9/20; A01G 9/24; A01G 9/143; A01G 13/0212
USPC .................................................. 47/65, 44–47
See application file for complete search history.

(56) References Cited

U.S. PATENT DOCUMENTS

| | | | | |
|---|---|---|---|---|
| 4,035,949 A | * | 7/1977 | Ruthner | ................. A01G 31/02 47/17 |
| 4,118,891 A | * | 10/1978 | Kehl | ..................... A01G 31/02 47/59 R |

(Continued)

FOREIGN PATENT DOCUMENTS

| | | | | |
|---|---|---|---|---|
| DE | 202007004127 U1 | 7/2007 | | |
| FR | 2865347 A1 | * 7/2005 | ............. | A01G 9/088 |

(Continued)

OTHER PUBLICATIONS

English-language translation of FR 2865347 (Year: 2005).*

(Continued)

*Primary Examiner* — Lisa L Tsang

(74) *Attorney, Agent, or Firm* — Hamilton, Brook, Smith & Reynolds, P.C.

(57) ABSTRACT

An automated plant training system and related methods are designed to train medium to tall plants to grow in a height restricted space by adjusting the plant's direction of growth through the use of phototropism. The device can physically control the plant's main stem, branches and foliage from excessive vertical growth.

25 Claims, 22 Drawing Sheets

(51) Int. Cl.
    *A01G 13/02*    (2006.01)
    *A01G 9/12*     (2006.01)

(56)         References Cited

U.S. PATENT DOCUMENTS

| | | | | |
|---|---|---|---|---|
| 4,813,176 | A * | 3/1989 | Takayasu | A01G 31/02 |
| | | | | 47/59 R |
| 6,243,987 | B1 | 6/2001 | Hessel | |
| 6,804,912 | B2 * | 10/2004 | van Weel | A01G 2/30 |
| | | | | 47/62 R |
| 8,250,810 | B2 | 8/2012 | van Zijl | |
| 9,357,716 | B1 * | 6/2016 | Takeda | A01G 17/06 |
| 10,506,770 | B2 * | 12/2019 | Galonska | A01G 31/04 |
| 2014/0157662 | A1 * | 6/2014 | Wallace | A01G 9/241 |
| | | | | 47/17 |
| 2014/0225003 | A1 | 8/2014 | Koo et al. | |
| 2014/0259911 | A1 | 9/2014 | Davis | |
| 2014/0318012 | A1 | 10/2014 | Fujiyama | |
| 2016/0278303 | A1 * | 9/2016 | Calsbeek | A01G 9/12 |
| 2016/0371830 | A1 | 12/2016 | Barrasso et al. | |
| 2017/0064910 | A1 | 3/2017 | Newton | |
| 2017/0094914 | A1 * | 4/2017 | Paquette | F21V 23/003 |
| 2018/0242531 | A1 * | 8/2018 | Berry, III | A01G 9/24 |

FOREIGN PATENT DOCUMENTS

| | | |
|---|---|---|
| JP | 2012100591 A | 5/2012 |
| KR | 1020130000122 | 1/2013 |
| WO | 2009048327 A1 | 4/2009 |
| WO | 2016020272 A1 | 2/2016 |
| WO | 2016207900 A1 | 12/2016 |

OTHER PUBLICATIONS

International Search Report and Written Opinion for International Application No. PCT/US2018/027939, entitled "System and Method for Automated Plant Training", dated Aug. 24, 2018.
Tucker, A., Shoe-box Maze, In Plants for Kids (online), Dec. 15, 2016 (retrieved Jun. 21, 2018). http://herbarlum.desu.edu/pfk/page11/page12/page13/page13.html.
International Search Report and Written Opinion for International Application No. PCT/US2018/027939, entitled "System and Method for Automated Plant Training", dated Oct. 22, 2019.
Horizon: The EU Research & Innovation Magazine, "Houses to be grown using plant-robot hybrids", pp. 6, Mar. 29, 2017.
Invitation to Pay Additional Fees for International Application No. PCT/US2018/027939, entitled "System and Method for Automated Plant Training", dated Jun. 19, 2018.

* cited by examiner

SYSTEM AND METHOD FOR AUTOMATED PLANT TRAINING

RELATED APPLICATIONS

This application claims the benefit of U.S. Provisional Application No. 62/486,528, filed on Apr. 18, 2017, and of U.S. Provisional Application No. 62/574,411, filed on Oct. 19, 2017. The entire teachings of the above applications are incorporated herein by reference.

BACKGROUND

Conventional plant training systems, such as trellises, supports for plants and frames typically require the need for manual plant attachment and maintenance. This requires human intervention and consistent monitoring and attachment as the plant grows.

Additionally, conventional systems do not control plant height or vertical growth to a maximum. Current indoor stacked or tiered farming systems have plant height restrictions, which do not allow for the growth of tall plants indoors, without manual assistance. Tall plants are therefore conventionally grown outdoors, or manually controlled to restrict their height for indoor growth.

SUMMARY

An embodiment according to the invention is in the technical field of agriculture. More particularly, an embodiment according to the invention is in the technical field of automated plant training and cultivation.

In one embodiment according to the invention, there is provided an automated plant training system designed to train medium to tall plants to grow in a height restricted space.

A device in accordance with an embodiment of the invention can automatically track and adjust the growth and orientation of the plant. Through the use of phototropism, the device can adjust the plant's orientation from vertical to horizontal. As the plant grows in the horizontal direction, the device can gently restrict the plant's main stem, branches and foliage from vertical growth. When the plant enters the flowering stage, the device can allow the side branches of the plant to extend upwards towards beneficial light. The device can control the overall height of the side branches to a predetermined level to fit within a tiered or stacked arrangement.

In accordance with one embodiment of the invention, there is provided an automated plant training system, wherein the system is configured to train a plant of medium height or tall height to grow in a height-restricted space by adjusting the plant's direction of growth through the use of phototropism.

In accordance with another embodiment of the invention, there is provided an automated plant training system, the system comprising: a means of manipulating a plant to maintain growth of the plant in a horizontal direction in a predetermined growth path, in an automated fashion.

In further, related embodiments, the automated plant training system may be configured to physically control the plant's main stem, branches and foliage from excessive vertical growth.

In another embodiment according to the invention, there is provided an automated plant training system. The system comprises an apex opening comprising a light opening; a grow channel enclosure surrounding at least a portion of an interior of the grow channel enclosure other than a portion comprising the light opening of the apex opening; a controller adapted to receive at least one of: (i) a predetermined growth control signal, and (ii) a sensed growth control signal produced based on a sensed presence of a plant growing in the interior of the grow channel enclosure; and a drive mechanism adapted to cause the apex opening to be moved in a direction of a predetermined growth path under control of at least one of: (i) the predetermined growth control signal, and (ii) the sensed growth control signal.

In further, related embodiments, the drive mechanism may be coupled to at least a motor adapted to move at least a portion of the drive mechanism in response to at least one of: (i) the predetermined growth control signal, and (ii) the sensed growth control signal. The system may further comprise an apex sensor adapted to detect at least one of a height, presence and condition of an apex of the plant. The drive mechanism may comprise at least one of: at least one wall support of the grow channel enclosure, the apex opening, and at least one main stem push bar. The drive mechanism may further comprise one or more of: a motor; an air actuator; a hydraulic actuator; a spring actuator; a weight actuator; a belt; a chain; a shaft; a cable; and a pulley. The drive mechanism may comprise at least one wall support of the grow channel enclosure, and may further comprise at least one track in which the at least one wall support is engaged. The at least one track may extend in a substantially linear horizontal grow path. The at least one track may extend in at least one of: a spiral grow path, a U-shaped grow path, and an elliptical grow path. The least one wall support may comprise a channel wall support flexible joint adapted to permit at least a portion of the at least one wall support to swing away from the interior of the grow channel enclosure to allow access to the plant.

In other related embodiments, the drive mechanism may be adapted to move the apex opening in a direction of a predetermined growth path under control of at least the predetermined growth control signal, the predetermined growth control signal being adapted to signal the drive mechanism to move the apex opening based on a predetermined distance per time pattern. The predetermined distance per time pattern may comprise a distance per day of between about 0.1 inch per day and about 12 inches per day, such as at least one of: between about 0.1 inches per day to about 2.1 inches per day, for example between about 0.5 inches per day to about 1 inch per day, and for example between about 0.75 inches per day to about 1 inch per day.

In further related embodiments, the system may further comprise a base adapted to support the plant, the base comprising an opening adapted to permit the plant's apex to grow above the surface of the base. The system may further comprise a main stem support stand mounted to the base. The system may further comprise a main stem push bar adapted to force the plant to bend horizontally over the main support stand. The system may comprise at least one fan, blower or opening adapted to move air through or into at least a portion of the interior of the grow channel enclosure. The at least one fan may be adapted to move relative to the grow channel enclosure. The grow channel enclosure may be adapted to at least one of (i) attenuate an intensity of light passing from an exterior to an interior of the grow channel enclosure and (ii) filter at least one wavelength range of light passing from the exterior to the interior of the grow channel enclosure, in portions of a three-dimensional space surrounding the interior of the grow channel enclosure other than the portion comprising the light opening of the apex opening. A material of the grow channel enclosure may be air-permeable. The system may further comprise more than one such automated plant training system in a vertically stacked or tiered arrangement. The apex opening may comprise an apex funnel at least a portion of which forms the light opening of the apex opening. At least one of the predetermined growth control signal and the sensed growth control signal may comprise a mechanical control signal. At least one of the predetermined growth control signal and the sensed growth control signal may comprise an electrical control signal.

In another embodiment according to the invention, there is provided a method of plant training. The method comprises growing a plant under first light conditions during a growth phase, while constraining vertical growth of the plant; altering light conditions of the plant to second light conditions at a light switch time while continuing to constrain the vertical growth of the plant; and subsequently removing constraints on vertical growth of the plant, after the light switch time. The method may performed using an automated plant training system comprising: an apex opening comprising a light opening; a grow channel enclosure surrounding at least a portion of an interior of the grow channel enclosure other than a portion comprising the light opening of the apex opening; a controller adapted to receive at least one of: (i) a predetermined growth control signal, and (ii) a sensed growth control signal produced based on a sensed presence of a plant growing in the interior of the grow channel enclosure; and a drive mechanism adapted to cause the apex opening to be moved in a direction of a predetermined growth path under control of at least one of: (i) the predetermined growth control signal, and (ii) the sensed growth control signal. The altering the light conditions and the removing constraints on the vertical growth of the plant may be performed automatically. A time between the light switch time and the removing constraints on the vertical growth of the plant may be controlled using electronic control signals based on at least one of a strain of the plant or a type of the plant.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
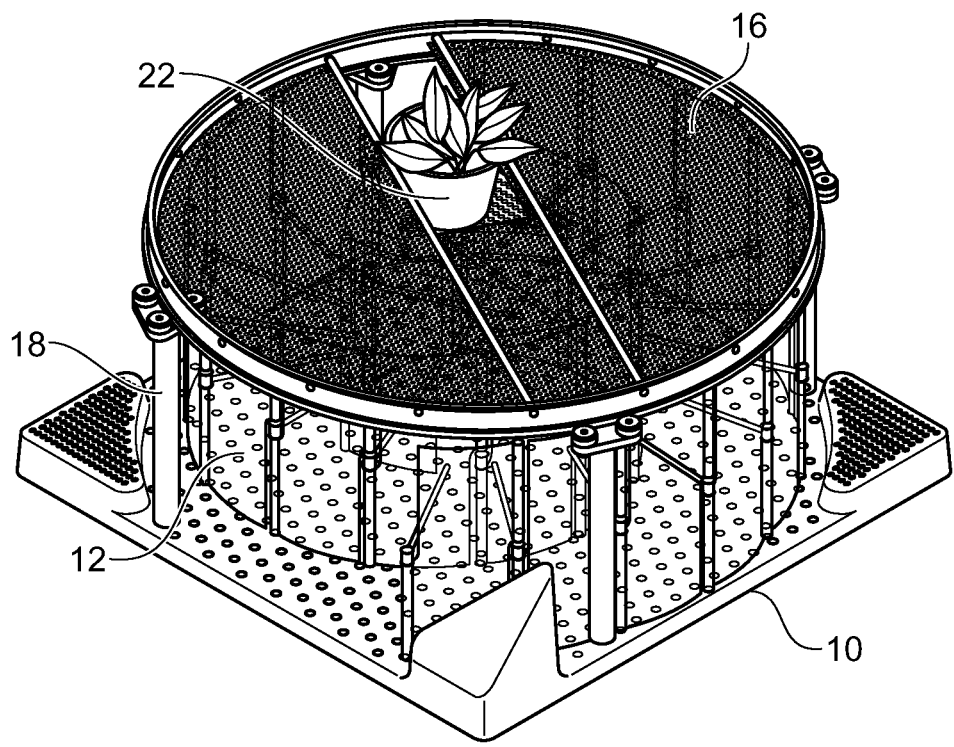
FIG. 1 is a perspective view of an automated plant trainer in accordance with a first embodiment of the invention.
Figure 2:
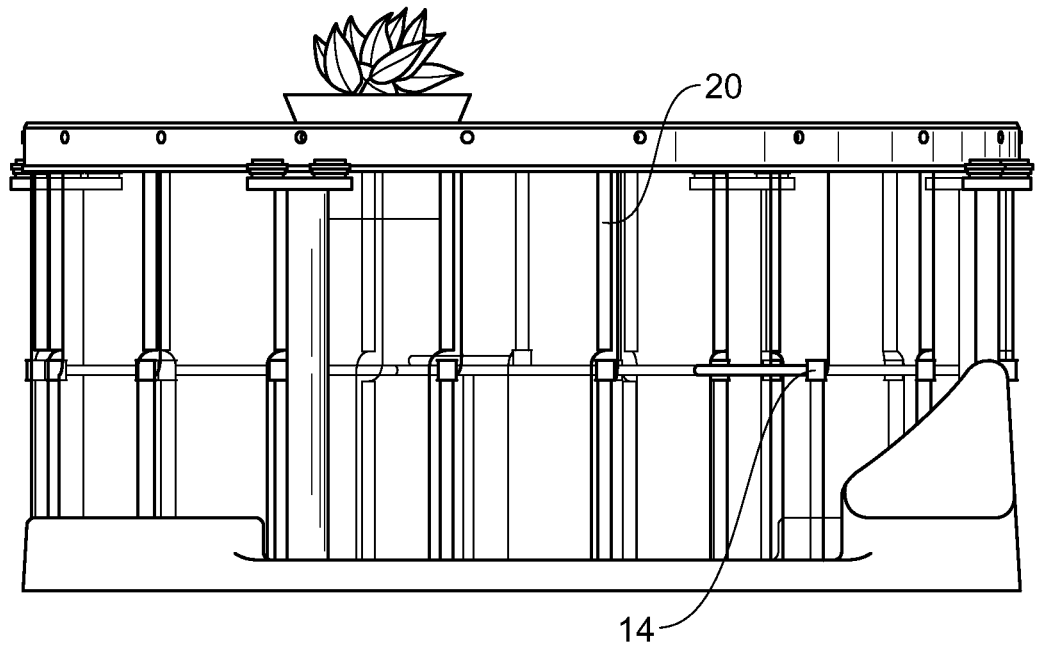
FIG. 2 is a side view of the automated plant trainer of the embodiment of FIG. 1.
Figure 3:
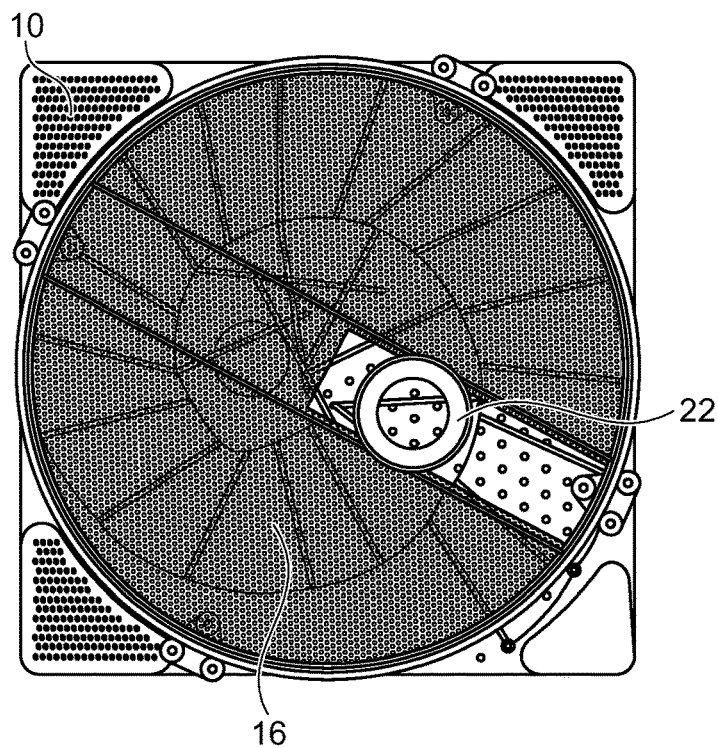
FIG. 3 is a top view of the automated plant trainer of the embodiment of FIG. 1.

In accordance with an embodiment of the invention, FIG. 1, FIG. 2 and FIG. 3 show a base 10 which is used to support a plurality of modular walls 12. The modular walls 12 are arranged in a circular or spiral configuration. A series of pivoting horizontal members 14 (see FIG. 2) are attached to the modular wall supports 20. Additionally, a planar rotating surface 16 (see FIG. 1) is suspended over the modular walls 12 and attached to the base 10 by one or more height adjustable towers 18. The planar rotating surface 16 has a mobile opening 22 within.

Figure 4:
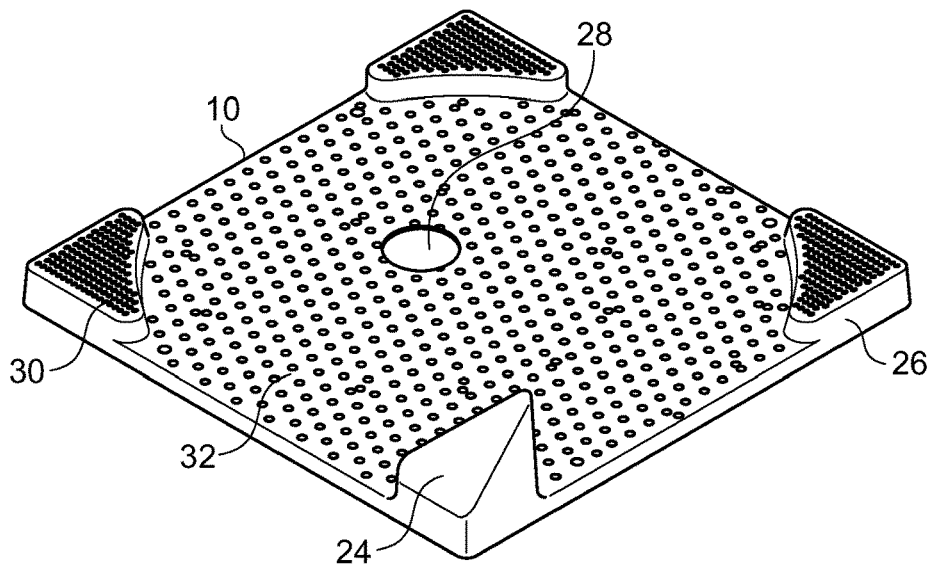
FIG. 4 is a perspective view of the base of the automated plant trainer of the embodiment of FIG. 1.

Referring now to FIG. 1 and FIG. 4, in accordance with an embodiment of the invention, the base 10 is used as the main support for the plant, modular walls 12 and the planar rotating surface 16. The base 10 is also utilized for the placement of control panel 24 and fans 26 (see FIG. 4). The base 10 can, for example, have an equal length and width, with a dimensional range of 12 inches to 48 inches. There are a series of openings on the top surface of the base 10, which are utilized for the following purposes: first, a growth opening 28 is sufficiently sized to allow for placement of a plant into the center of the base 10. Second, a series of fan supply openings 30 are present to allow inlet air to the fans 26. Third, a separate series of ventilation openings 32 are present to provide fresh air to the plant within the modular walls 12. The fans 26, fan supply openings 30, and ventilation openings 32 are sufficiently sized to provide adequate airflow to the plants. The base 10 can, for example, be made of any sufficiently rigid and strong material with a water resistant property such as high-strength plastic, metal, and the like.

Figure 5:
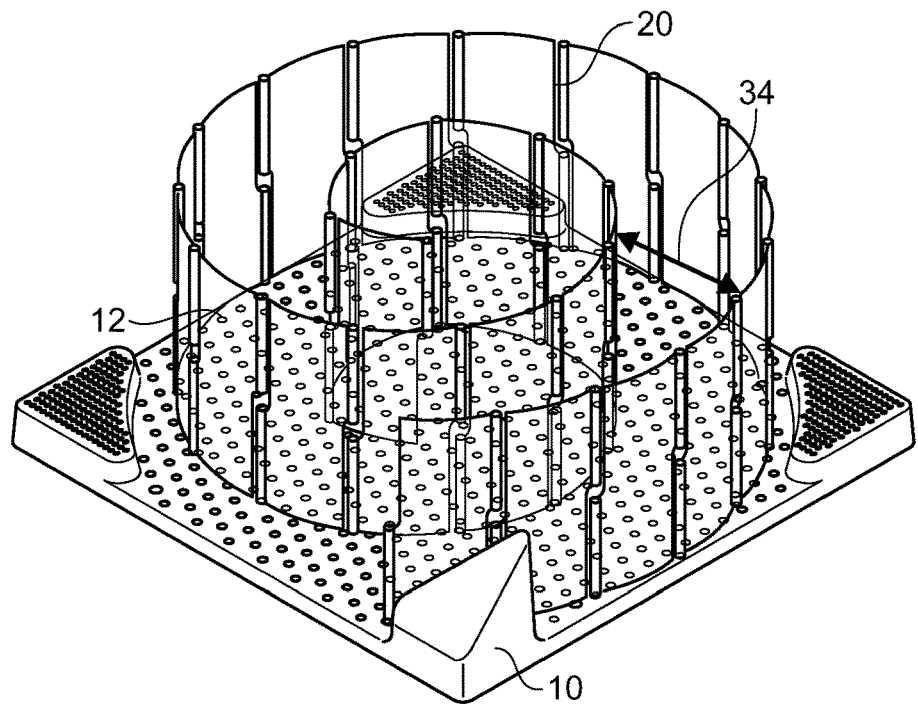
FIG. 5 is a perspective view of the foliage control components of the automated plant trainer of the embodiment of FIG. 1.

Referring now to FIG. 5, in accordance with an embodiment of the invention, the modular walls 12 are interconnected to one another by a modular wall supports 20. The modular wall supports 20 are attached to the base 10. The modular walls 12 are arranged to provide an adjustable horizontal channel 34 for the plant's foliage, stems and branches. The height of the modular walls 12 can, for example, be one inch to twenty-four inches from the base 10. The width of each individual modular wall 12 can, for example, be within a range of 1-inch to 12 inches. The modular walls 12 have a series of holes or a gridded pattern. The holes or grid are adequately sized and spaced to allow for adequate airflow and light penetration. The modular walls 12 can, for example, be made of any sufficiently rigid and strong material with a water resistant property such as high-strength plastic, metal, fabric, mesh and the like.

Figure 6:
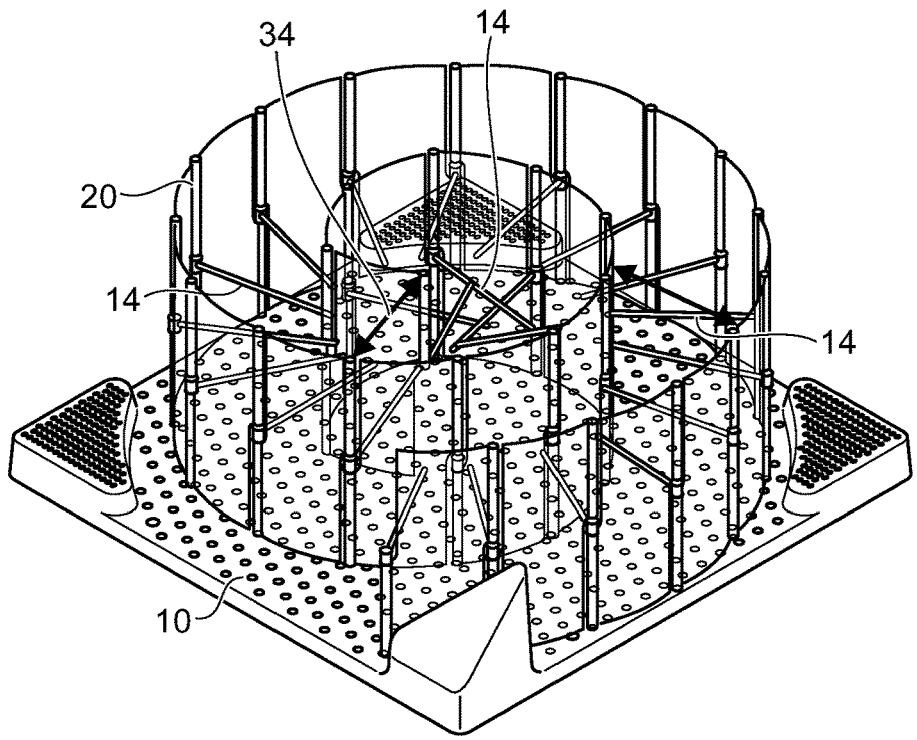
FIG. 6 is a perspective view of the stem control components of the automated plant trainer of the embodiment of FIG. 1.

Referring now to FIG. 5 and FIG. 6, in accordance with an embodiment of the invention, the pivoting horizontal members 14 (see FIG. 6) are attached to the modular wall supports 20. Before plant growth, the pivoting horizontal members 14 are held disengaged and against the modular wall 12 (see FIG. 5). As the plant grows, the closest pivoting horizontal members 14 (see FIG. 6) can rotate either clockwise or counter-clockwise towards the plant's main stem, causing the main stem to bend in the horizontal direction. As the plant grows further, the next closest horizontal pivoting members 14 can rotate, as required, to push the main stem in the horizontal dimension. This processes repeats as the plant continues to grow, forcing the main stem to grow horizontally through the adjustable horizontal channel 34. The pivoting horizontal members 14 can be placed at any height from the surface of the base 10. Additionally, more than one pivoting horizontal member 14 can be located at the same modular wall support 20. The placement and number of pivoting horizontal members 14 can vary in order to provide consistent engagement with the plant's main stem. Pivoting horizontal members 14 are controlled by a series of motors, belts and/or pulleys and they can operate either dependently or independently from one another. The length of the pivoting horizontal member 14 is approximately equal to the width of the adjustable horizontal channel 34. The shape of the pivoting horizontal member 14 can vary, to reduce foliage and stem damage. The pivoting horizontal member 14 can, for example, be made of any sufficiently rigid and strong material with a water resistant property such as high-strength plastic, metal, and the like.

Figure 7:
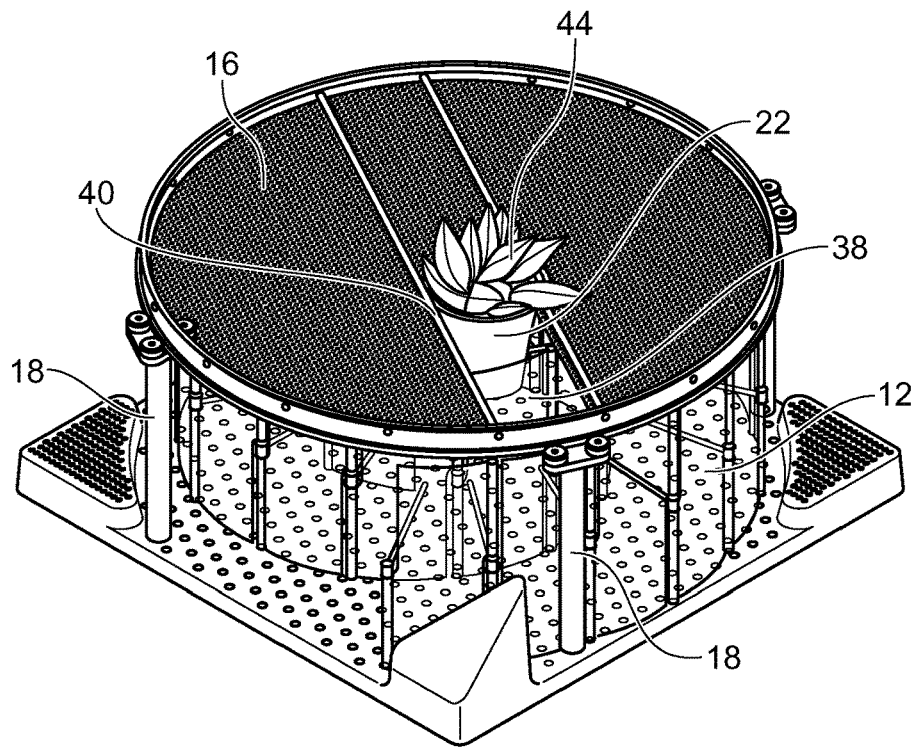
FIG. 7 is a perspective view of the apex control components of the automated plant trainer of the embodiment of FIG. 1.

Referring now to FIG. 7, in accordance with an embodiment of the invention, the planar rotating surface 16 is located above the modular walls 12 and supported by height adjustable towers 18 attached to the base 10. The rotation and height are controlled by a series of motors, belts, gears, shafts, cables and/or pulleys. The planar rotating surface 16 is held in the start position prior to the plant growth. As the plant grows the planar rotating surface 16 can rotate in the same direction of the plant's growth. The planar rotating surface 16 has a series of gridded holes to allow adequate airflow and light penetration. An opening 38, within the planar rotating surface 16, is present to allow the plant apex 44 to grow through the planar rotating surface 16. The overall diameter of the planar rotating surface 16 is, for example, no greater than the length of the base 10. The planar rotating surface has a series of ventilation holes or perforations to allow air flow. The planar rotating surface 16 can, for example, be made of any sufficiently rigid and strong material with a water resistant property such as high-strength plastic, metal, fabric, mesh and the like. In accordance with an embodiment of the invention, it also provides light filtration to reduce the environment's light intensity, to create negative phototropism for the plant foliage located below.

Referring now to FIG. 6 and FIG. 7, in accordance with an embodiment of the invention, the mobile opening 22 is located within the opening 38. The mobile opening 22 is attached to one or more cross rods 40 (see FIG. 7) which allow the mobile opening 22 to move or slide within the opening 38. As the plant grows, the apex 44 of the plant can move towards the mobile opening 22, through positive phototropism. As the apex 44 continues to grow, the planar rotating surface 16 can rotate in the direction of growth. At the same time the mobile opening 22 slides within the opening 38. The continuous movement of the mobile opening 22 promotes continuous growth of the apex 44. The planar rotating surface 16 and the mobile opening 22 can continue to move until the plant reaches the end of the adjustable horizontal channel 34 (see FIG. 6). The shape and configuration of the mobile opening 22 (see FIG. 7) are arranged to promote apex growth through the mobile opening 22. The mobile opening 22 may have lights attached to increase light intensity and positive phototropism at the plant's apex location. The mobile opening 22 can, for example, be made of any sufficiently rigid and strong material with a water resistant property such as high-strength plastic, metal, and the like.

Figure 8:
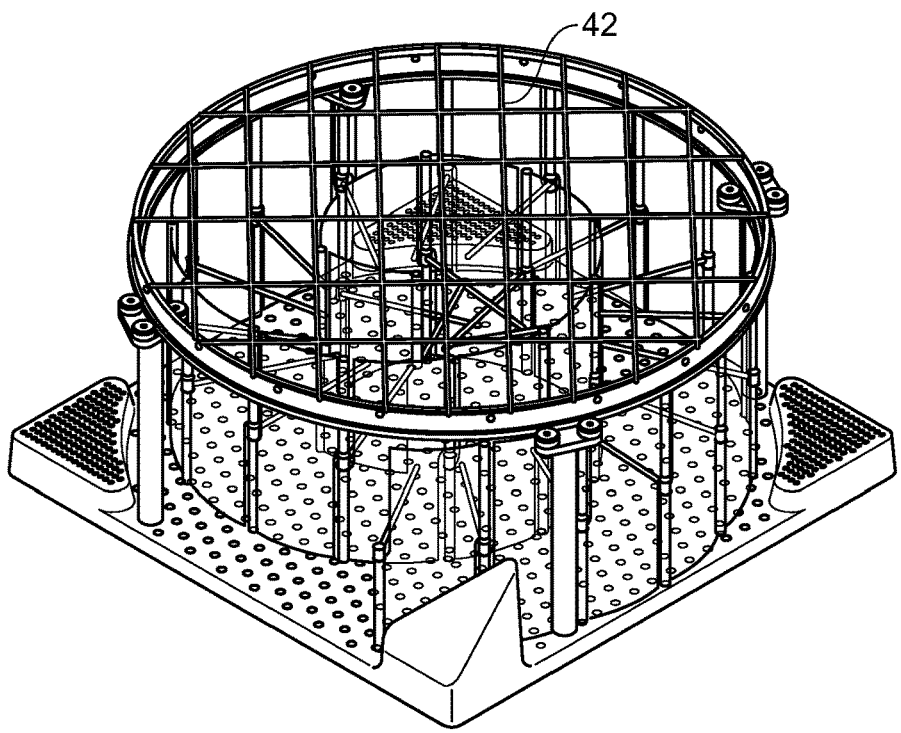
FIG. 8 is a perspective view of a device of the embodiment of FIG. 1 when the plant is in the "flowering" stage.

Referring now to FIG. 6, FIG. 7 and FIG. 8, in accordance with an embodiment of the invention, once the plant reaches the end of the adjustable horizontal channel 34, the plant is ready for the next growth stage "flowering". At this point, the user has two options. The first option includes the complete removal of the planar rotating surface 16 (see FIG. 7) and mobile opening 22, allowing the side branches and leaves to grow vertically towards the light without further restriction. The second option includes the replacement of the planar rotating surface with a flower support grid 42 (see FIG. 8). The flower support grid 42 has a series of openings to allow the side branches and leaves to grow thru the grid as they reach for the light source above. As the plant grows and flowers, the flower support grid 42 can automatically adjust in height since it is attached to the height adjustable towers 18. The flower support grid 42 can rotate clockwise and counterclockwise to either inhibit or promote the vertical growth of the side branches and leaves. At the end of the flowering stage, the flower support grid 42 can be removed in order for the user to interact with the plant for harvest. The flower support grid 42 can, for example, be made of any sufficiently rigid and strong material with a water resistant property such as high-strength plastic, metal, fabric, mesh, wires, fabric and the like.

In order to automatically control a device in accordance with an embodiment of the invention, one or more of the following sensors, such as all of the following sensors, can be included: (i) One or more apex sensors to detect the presence of apex foliage at the mobile opening 22 (see FIG. 7). The apex sensor can also detect the apex distance above the planar rotating surface 16 or the flower support grid 42 (see FIG. 8). (ii) One or more light intensity sensors to measure the light intensity at the apex location and within the adjustable horizontal channel 34 (see FIG. 6). (iii) One or more carbon dioxide sensors to detect the level of available carbon dioxide in the adjustable horizontal channel 34. (iv) One or more air flow sensors to detect the movement of air in the adjustable horizontal channel 34. (v) One or more humidity sensors to detect the level of humidity in the air within the adjustable horizontal channel 34. Additionally, the device can, for example, monitor the length of the plant's main stem by tracking the location of the mobile opening 22 (see FIG. 7) within the adjustable horizontal channel 34 (see FIG. 6). The sensors can provide one-time or continuous output readings to a processor which can provide output data to the control panel 24 (see FIG. 4) for the user. An embodiment according to the invention can also be implemented without any of the foregoing sensors, for example, using mechanical sensing or control techniques; or can include only the apex sensor 80.

In accordance with an embodiment of the invention, the control panel 24 can include a power on/off switch, and the user can, for example, modify the device's automation based on one or more of plant type, desired stem length, and time duration for vegetation and flowering stages through control panel input. The user can, for example, connect to the device via wired, wireless, Wi-Fi or Bluetooth connection. This can allow the user to monitor the device from a remote location or a third-party control management system. In one embodiment, remote monitoring and control of the device can, for example, be performed using a software application ("App") implemented on a mobile or other computing device.

A device in accordance with an embodiment of the invention can be powered by a combination of solar and external power supplies. The devices can also be daisy-chained to one another to provide power to multiple devices through one or more power connections.

Advantages of an embodiment in accordance with the invention, such as that of FIG. 1, include, without limitation, that the system is portable and can be used for small to medium height plants.

Figure 9:
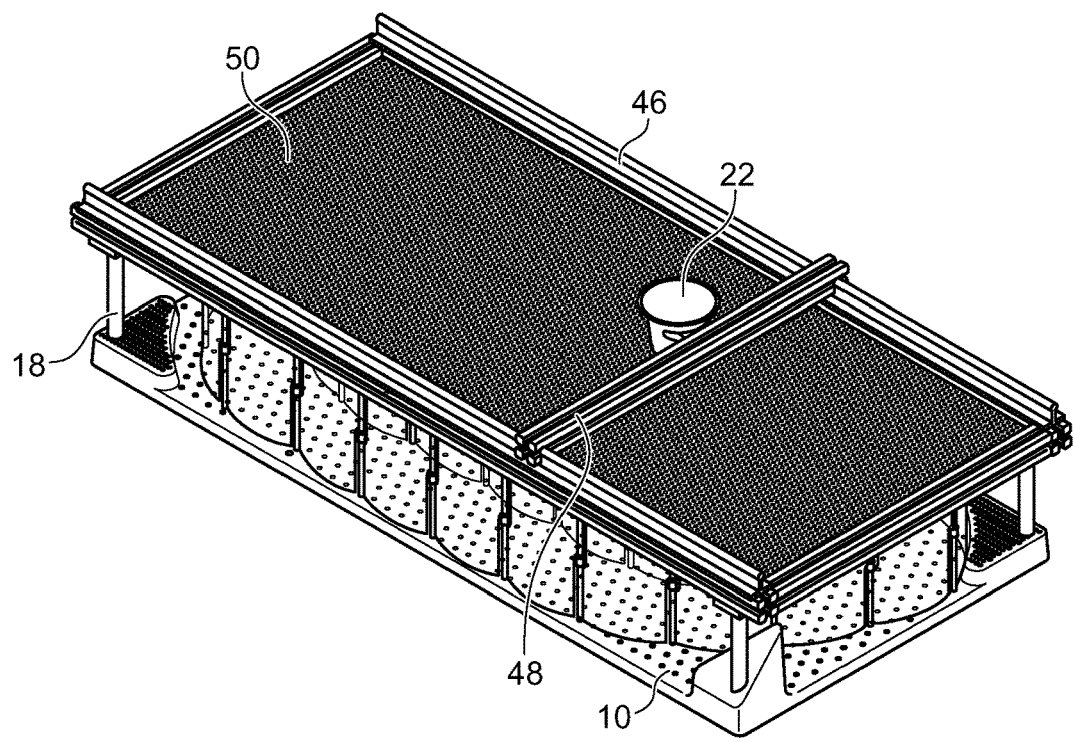
FIG. 9 is a perspective view of a second embodiment of an automated plant trainer in accordance with an embodiment of the invention.

FIG. 9 shows a device in accordance with another embodiment of the invention, which has a base 10 with a rectangular shape, although it will be appreciated that other base shapes can be used, such as circular, elliptical or other shapes, in accordance with embodiments of the invention. In the embodiment of FIG. 9, the mobile opening 22 is attached to a mobile transverse rail 48. The mobile opening 22 can move along the mobile transverse rail 48. The mobile transverse rail 48 is attached to one or more longitudinal rails 46. The mobile transverse rail 48 can slide along the length of the longitudinal rails 46. The longitudinal rails 46 are attached to and supported by height adjustable towers 18. A planar mobile surface 50 is attached to the longitudinal rails 46 and height adjustable towers 18. The planar mobile surface 50 has an opening at the mobile opening 22 location. The planar mobile surface can adjust automatically as the mobile opening 22 adjusts. For example, the planar mobile surface 50 can be implemented as a set of sliding retractable blinds that withdraw and extend in length from either end of the device and/or from the side rails 46, as the mobile opening 22 moves location between the rails 46 and along the transverse rail 48. The mobile opening 22, mobile transverse rail 48 and planar mobile surface 50 can be automatically controlled by a series of motors, belts, gears, shafts, cables and/or pulleys in order to ensure that the mobile opening 22 controls the plant's apex as it grows. It will be appreciated that, rather than using motors, other actuators can be used in accordance with embodiments of the invention, such as air or hydraulic actuators, or using spring and/or weight actuation. The mobile transverse rail 48 and longitudinal rail 46 can, for example, be made of any sufficiently rigid and strong material with a water resistant property such as high-strength plastic, metal, and the like. The planar mobile surface 50 can, for example, be made of any sufficiently rigid and strong material with a water resistant property such as high-strength plastic, metal, fabric, mesh and the like. In accordance with an embodiment of the invention, the planar mobile surface 50 can also provide light filtration to reduce the environment's light intensity, to create negative phototropism for the plant foliage located below. Advantages of the embodiment of FIG. 9 include, without limitation, that it has a larger base 10 and can be used for taller plants.

Figure 10:
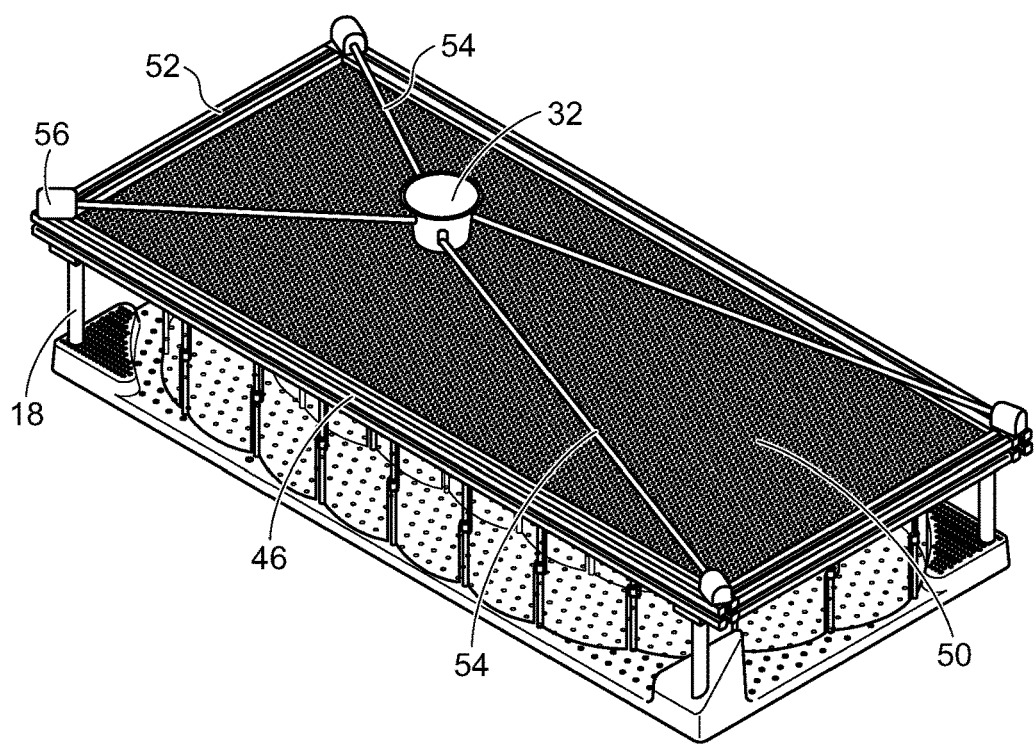
FIG. 10 is a perspective view of a third embodiment of an automated plant trainer in accordance with an embodiment of the invention.

In accordance with another embodiment of the invention, in FIG. 10 there is shown a device with a mobile opening 22 attached to one or more control cables 54. The control cables 54 are attached to cable motors 56. The cable motors 56 are attached to one or more longitudinal rails 46 and one or more static transverse rails 52 which are supported by height adjustable towers 18. A planar mobile surface 50 is attached to the longitudinal rails 46 and transverse rail 48. The planar mobile surface 50 has an opening at the mobile opening 22 location. The planar mobile surface's 50 opening can adjust automatically as the mobile opening 22 adjusts. For example, the planar mobile surface 50 can be implemented as a set of sliding retractable blinds that withdraw and extend in length from either end of the device and/or from the side rails 46, as the mobile opening 22 moves location between the rails 46 and along the transverse rail 48. The mobile opening 22 and control cables 54 can be controlled by a series of motors, belts and/or pulleys in order to ensure that the mobile opening 22 controls the plant's apex as it grows. The static transverse rail 52 and longitudinal rail 46 can, for example, be made of any sufficiently rigid and strong material with a water resistant property such as high-strength plastic, metal, and the like. The control cables 54 can, for example, be made of any sufficiently strong material with a water resistant property such as high-strength wire, plastic or cabling. The planar mobile surface 50 can, for example, be made of any sufficiently rigid and strong material with a water resistant property such as high-strength plastic, metal, fabric, mesh and the like. In accordance with an embodiment of the invention, it can also provide light filtration to reduce the environment's light intensity, to create negative phototropism for the plant foliage located below. Advantages of the embodiment of FIG. 10 include, without limitation, that it has a larger base 10 and can be used for taller plants.

Figure 11:
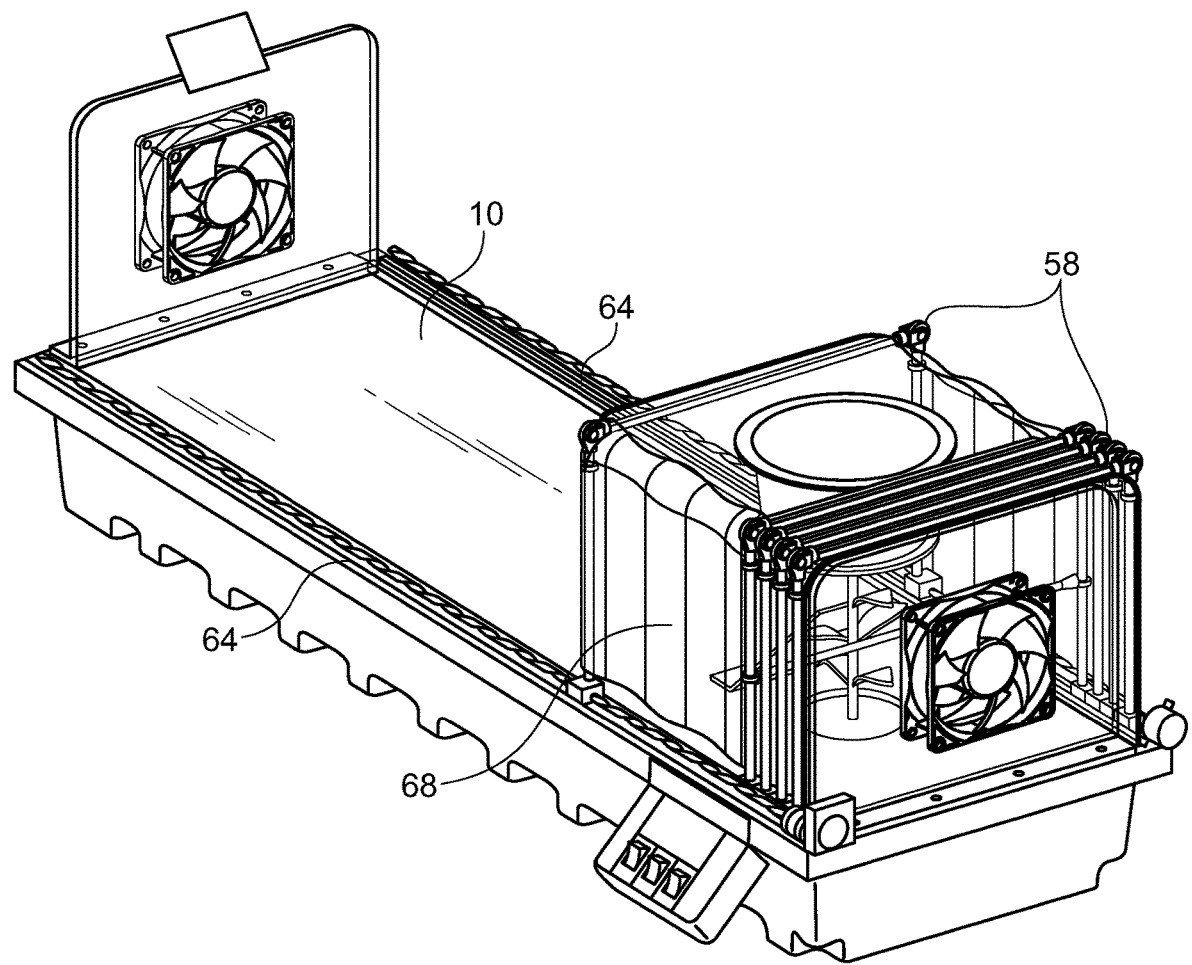
FIG. 11 is a perspective view of a fourth embodiment of an automated plant trainer in accordance with an embodiment of the invention.
Figure 12:
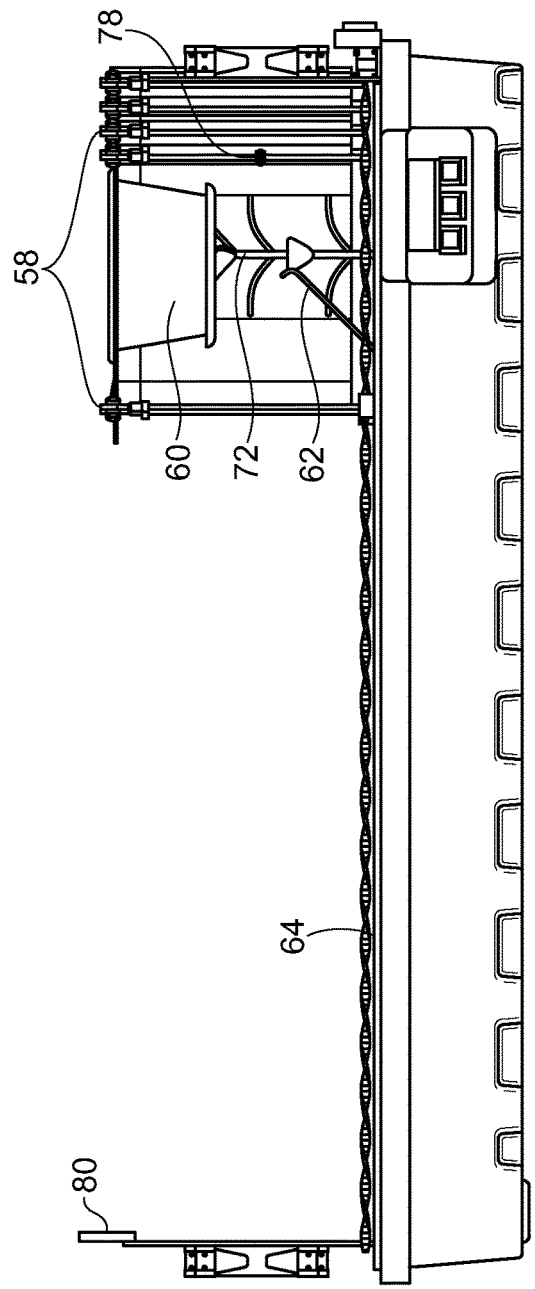
FIG. 12 is a side view of the automated plant trainer of the embodiment of FIG. 11.
Figure 13:
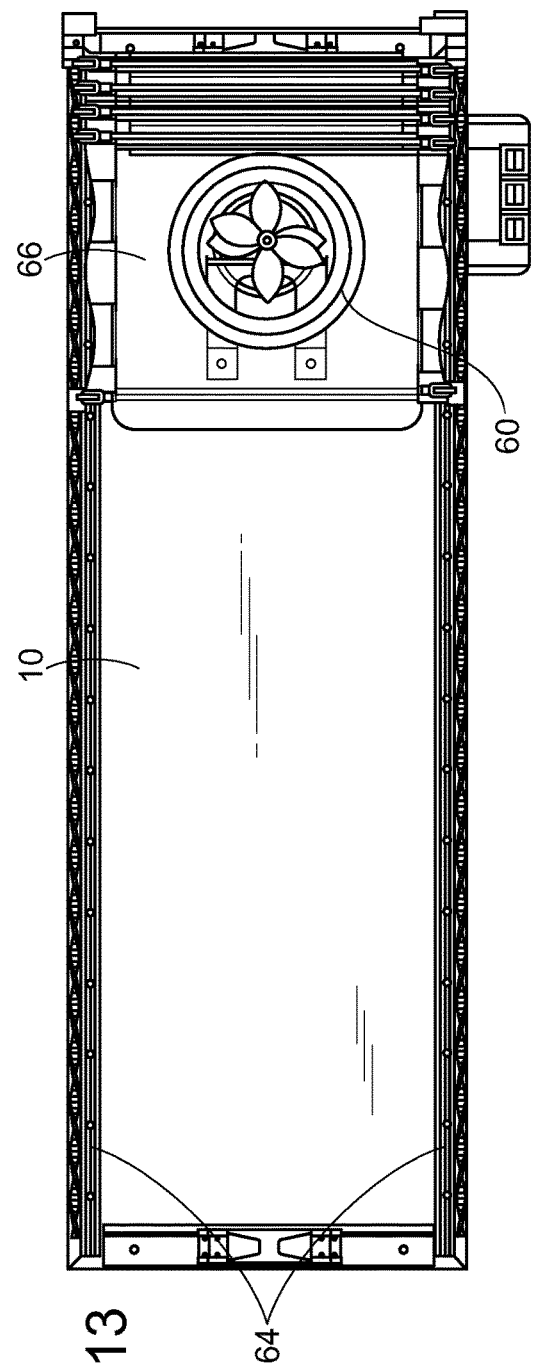
FIG. 13 is a top view of the automated plant trainer of the embodiment of FIG. 11.

Referring to FIG. 11, FIG. 12 and FIG. 13, there is shown another embodiment according to the invention, in which a base 10 is used to support one or more linear tracks 64. The linear tracks 64 are parallel to one another in a linear configuration along the base 10. A series of channel wall supports 58 are attached to the linear tracks 64 for mobility. Additionally, a planar funnel support surface 66 (see FIG. 13) is suspended over the base 10 and attached to one or more channel wall supports 58 (see FIG. 11). The planar funnel support surface 66 (see FIG. 13) has an opening for an apex funnel 60. A grow channel enclosure 68 (see FIG. 11) is attached to one or more channel wall supports 58 at various locations.

Figure 14:
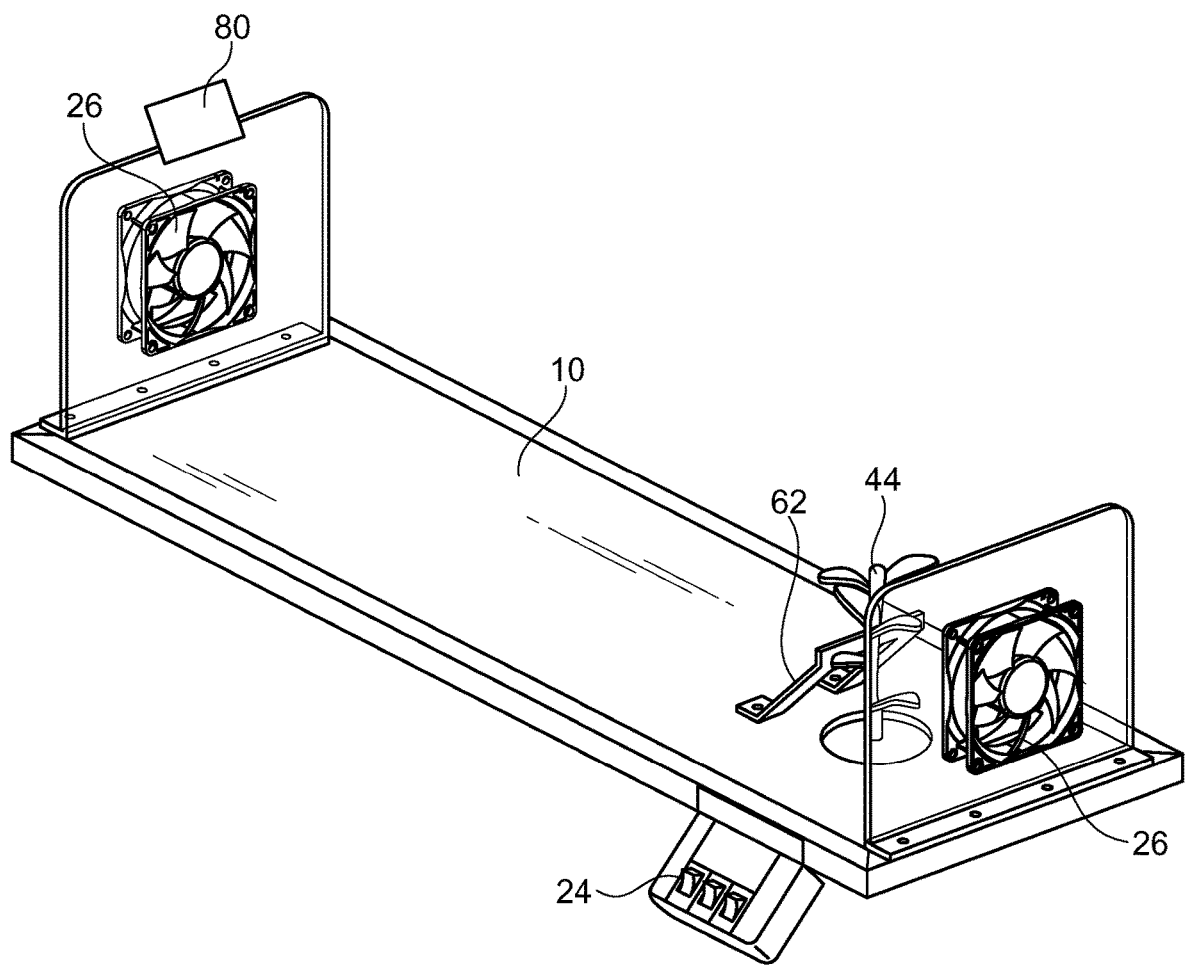
FIG. 14 is a perspective view of the base of the embodiment of FIG. 11.

FIG. 14 is a view of the embodiment of FIG. 11, with the grow channel enclosure 68 and other components removed for clarity. As shown in FIG. 14, the base 10 is used as the main support for the plant. The base 10 has an opening thru the base to allow for the plant's apex 44 to grow above the surface of the base. The base 10 is also utilized for the placement of control panel 24 and fans 26. One or more fans 26 can be located around the perimeter of the growth channel to promote air-flow to reduce mold, humidity and the presence of insects or pests. The flow rate, timing and duration of the fans 26 operation can vary to simulate natural breezes and gusts. The base 10 has a rectangular shape, although it will be appreciated that other base shapes can be used, such as circular, elliptical or other shapes, in accordance with embodiments of the invention. The base 10 can, for example, be made of any sufficiently rigid and strong material with a water and mold resistant properties such as high-strength plastic, metal, and the like.

Figure 15:
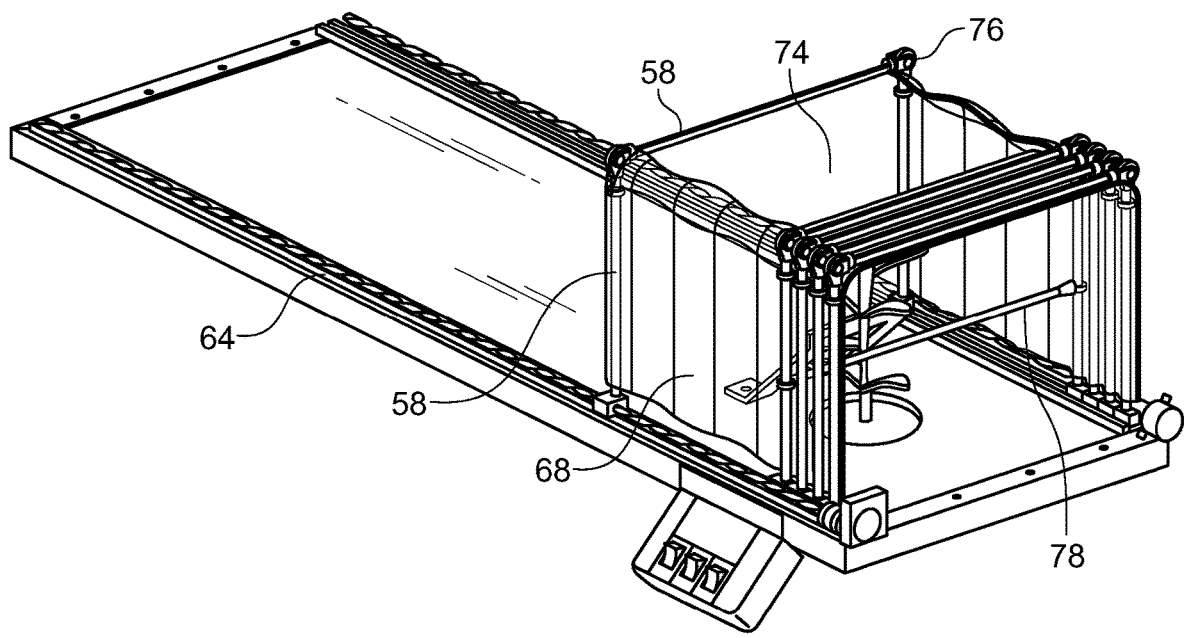
FIG. 15 is a perspective view of the foliage control components of the embodiment of FIG. 11.

Referring to the embodiment of FIG. 15, the grow channel enclosure 68 is attached to the outside of the channel wall supports 58. The bottom of the channel wall supports 58 are attached to the linear tracks 64. The channel wall supports 58 and grow channel enclosure 68 are arranged to provide a horizontal grow volume 74 for the plant's foliage, stems and branches. The arrangement of the linear tracks 64, channel wall supports 58, and grow channel enclosure 68 can be in one or more directions to create one or more separate or continuous horizontal grow volumes within the confined footprint of base 10 (see FIG. 14). The height of the channel wall supports 58 (see FIG. 15) can, for example, be one inch or more from the base 10 (see FIG. 14). The channel wall supports 58 (see FIG. 15) have a channel wall support flexible joint 76, such as a hinge or equivalent. The channel wall support flexible joint 76 can allow the horizontal or vertical portion of the channel wall support 58 to swing outwards, away from the horizontal grow volume, allowing access to the plant for periodic maintenance and inspection, as well as support during the plant's flowering stage. The width of horizontal grow volume 74 can, for example, be in a range of 4-inches or greater and the length can be 4 inches or greater. The grow channel enclosure 68 material can, for example, be breathable, air-permeable and made with light reduction and/or wavelength filtering capability except at the apex. The apex can receive the greatest light intensity and beneficial wavelengths to promote rapid and healthy apex growth. The channel wall supports 58 can, for example, be made of any sufficiently rigid and strong material with a water resistant property such as high-strength plastic, metal, fabric, mesh and the like.

Figure 16:
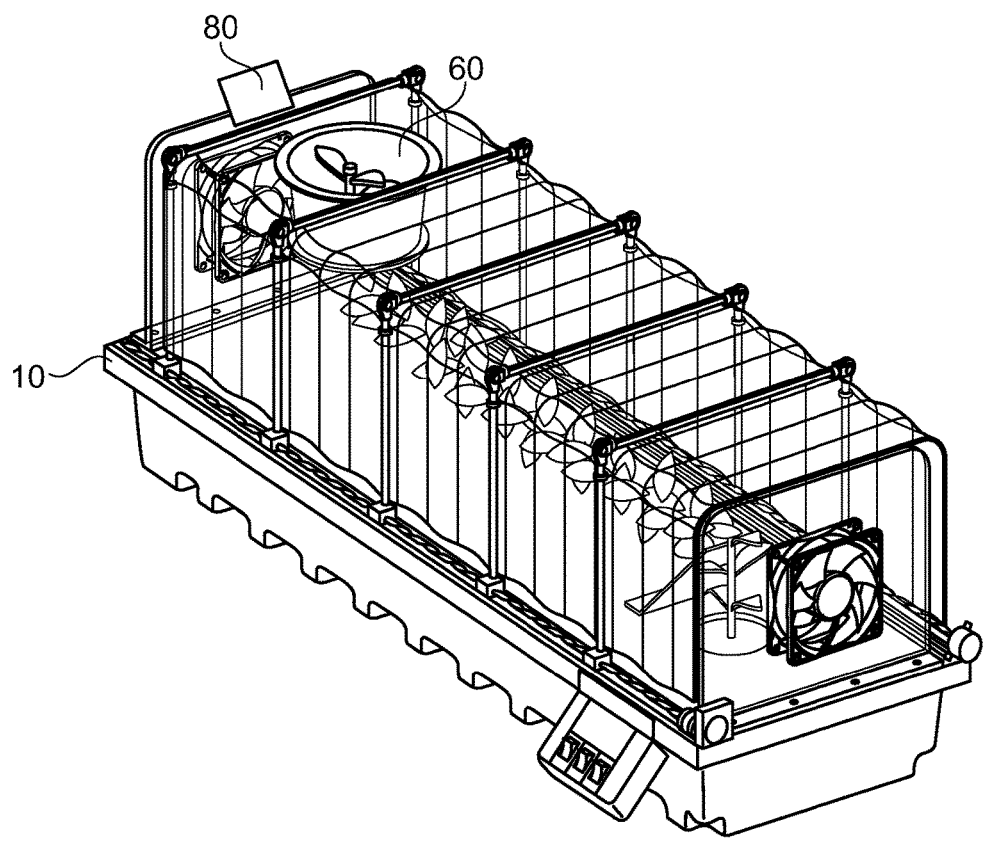
FIG. 16 is a perspective view of the embodiment of FIG. 11 at start of flowering stage.

Referring to the embodiments of FIG. 12, FIG. 14, FIG. 15 and FIG. 16, a main stem support stand 62 can be mounted to the base 10. Additionally, a main stem push bar 78 (see FIGS. 12 and 15) is attached to one or more of the channel wall supports 58. As the plant grows upwards and through the apex funnel 60, an apex sensor 80 (see FIGS. 12 and 14) detects the height, presence and condition of the apex 44 (see FIG. 14). When programmed conditions are detected, the channel wall supports 58 (see FIG. 12), the apex funnel 60 and one or more main stem push bars 78 are engaged to move horizontally along the base 10. The movement and travel rate of the channel wall supports 58 is controlled by the linear tracks 64 and a series of one or more rotary or linear motors and drive mechanism such as but not limited to belts, chains, shaft, cables and/or pulleys, and they can operate either dependently or independently from one another. As the bottom of the apex funnel 60 moves horizontally it reaches the plant's main stem 72, forcing the plant to bend horizontally over the main support stand 62. The horizontal movement of the channel wall supports 58, the apex funnel 60 and one or more main stem push bars 78 stop when the apex sensor 80 no longer detects the ideal or desired apex 44 (see FIG. 14) height and size parameters. As the apex 44 continues to grow, this process repeats itself, guiding the plant main stem 72 (see FIG. 12) to grow horizontally along and through the horizontal grow volume 74 (see FIG. 15). As shown in FIG. 16, the process stops once the apex funnel 60 reaches the end of the base 10. The placement of the main stem push bar 78 (see FIG. 15) can vary, in order to provide consistent engagement with the plant's main stem. The length of the main stem push bar 78 can be approximately equal to the width of the horizontal grow volume 74. The shape of the main stem push bar 78 and the apex funnel 60 (see FIG. 12) can vary, for example to reduce plant foliage and stem damage. The main stem support stand 62, the main stem push bar 78 and the apex funnel 60 can, for example, be made of any sufficiently rigid and strong material with a water-resistant property such as high-strength plastic, metal, and the like. The apex funnel 60 can, for example, be air-permeable.

Figure 17:
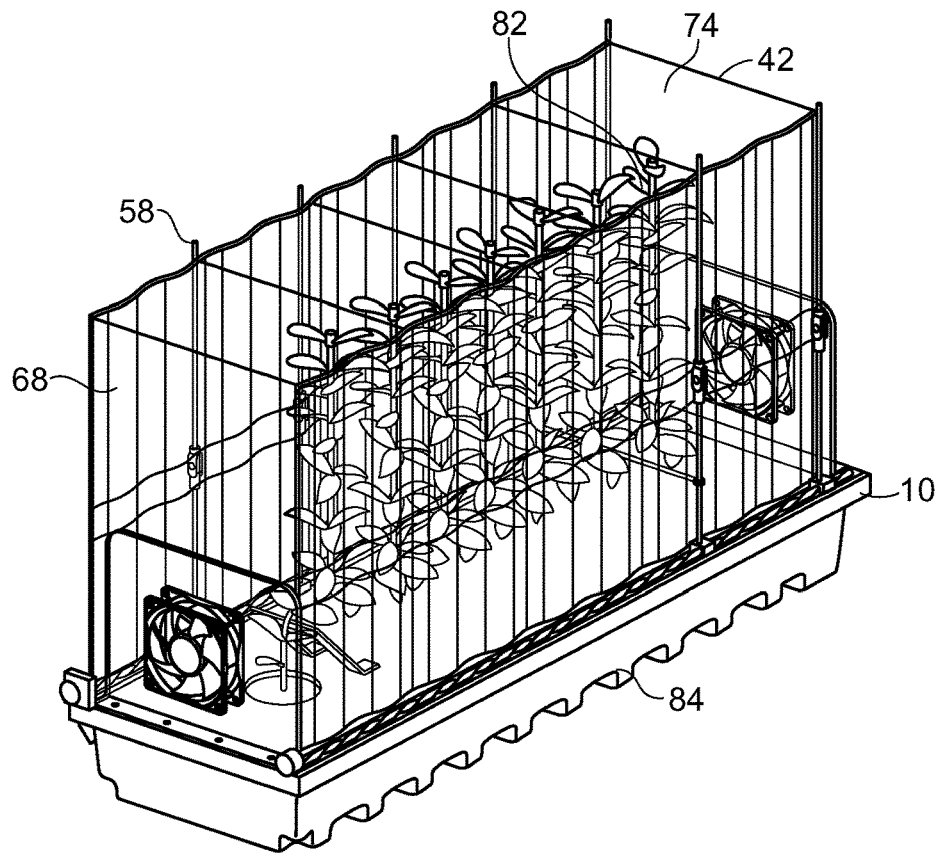
FIG. 17 is a perspective view of the flowering support components of the embodiment of FIG. 11.

Referring to the embodiments of FIG. 16 and FIG. 17, once the plant reaches the end of the base 10, the plant is ready for the next growth stage, "flowering". At this point, depending on the plant type and strain, the program can alert the user to switch the light cycle and plant nutrient feeding schedule to flowering conditions. The horizontal grow volume 74 can remain enclosed on top and all four sides by the grow channel enclosure 68. After a specified amount of time, for example 24 hours or more, the grow channel enclosure's 68 top surface can be opened, as shown in FIG. 17, by rotating the horizontal portion of the channel wall supports 58. This can create an opening along the top surface of the horizontal grow volume 74, thereby increasing the light intensity to the plant below in a uniform manner. The amount of time required to open the grow channel enclosure 68 can be based on the amount of time required to reduce "flowering stretch" to a minimum. With the top of the horizontal grow volume 74 removed, the plant side branches 82 can stretch towards the light, allowing flower development. A flower support grid 42 can be placed along the top of the channel wall supports for additional plant side branch 82 and flower support. The flower support grid 42 has a series of one or more gridded openings to allow the side branches and leaves to grow thru the grid as they reach for the light source above. As the plant grows and flowers, the flower support grid 42 can adjust in height. At the end of the flowering stage, the flower support grid 42 can be removed in order for the user to interact with the plant for harvest. The flower support grid 42 can, for example, be made of any sufficiently rigid and strong material with a water-resistant property such as high-strength plastic, metal, fabric, mesh, wires, fabric and the like.

Figure 18:
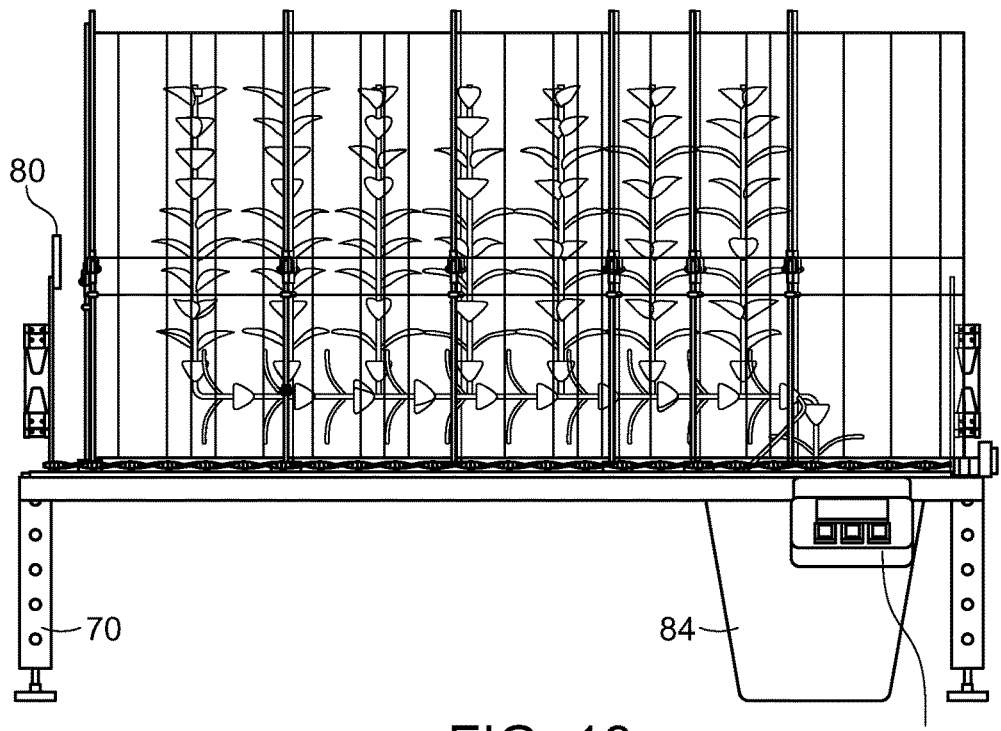
FIG. 18 is a side view of the device of the embodiment of FIG. 17 on supports.

Referring to the embodiments of FIG. 16, FIG. 17 and FIG. 18, the base 10 can be supported over a grow media container 84 (see FIG. 18) by two or more base support legs 70. The base support legs 70 are adjustable in height and can be used for floor support or mounted to a user provided racking system. The base support legs 70 can be with or without wheels to aid in movement and placement. The grow media container 84 can be user provided in the form of a pot, tank, reservoir or similar for use with soil, hydroponic, or aeroponic methods.

In order to automatically control the device of FIGS. 11-18, one or more of the following sensors (including all of the following sensors) can be included, in accordance with an embodiment of the invention: (i) One or more apex sensors 80 (see FIG. 16) to detect the presence of apex foliage at the apex funnel 60. The apex sensor 80 can also detect the apex distance above the apex funnel 60 or the flower support grid 42 (see FIG. 17). (ii) One or more light intensity sensors to measure the light intensity at the apex location and within the horizontal grow volume 74. (iii) One or more carbon dioxide sensors to detect the level of available carbon dioxide in the horizontal grow volume 74. (iv) One or more air flow sensors to detect the movement of air in the horizontal grow volume 74. (v) One or more humidity sensors to detect the level of humidity in the air within the horizontal grow volume 74. Additionally, the user can monitor the length of the plant's main stem by tracking the location of the apex within the horizontal grow volume 74. The sensors can, for example, provide one-time or continuous output readings to a processor which can provide output data to the control panel 24 (see FIG. 18) or another form of user interface such as a web portal or application. An embodiment according to the invention can also be implemented without any of the foregoing sensors, for example, using mechanical sensing or control techniques; or can include only the apex sensor 80. The control panel 24 can include a power on/off switch, and the user can, for example, modify the device's automation based on one or more of plant type, desired stem length, and time duration for vegetation and flowering stages through control panel input. The user can, for example, connect to the device via wired, wireless, Wi-Fi or Bluetooth connection. This can, for example, allow the user to monitor the device from a remote location or a third-party control management system. In accordance with an embodiment of the invention, the device can be powered by a combination of solar and external power supplies. The devices can also be interconnected to one another to provide power to multiple devices through one or more power connections.

The advantages of an embodiment according to the present invention, as shown in FIGS. 11-18, include, without limitation, that it is portable, and narrow enough to be placed close to other, similar, devices within a typical rack arrangement.

Figure 19:
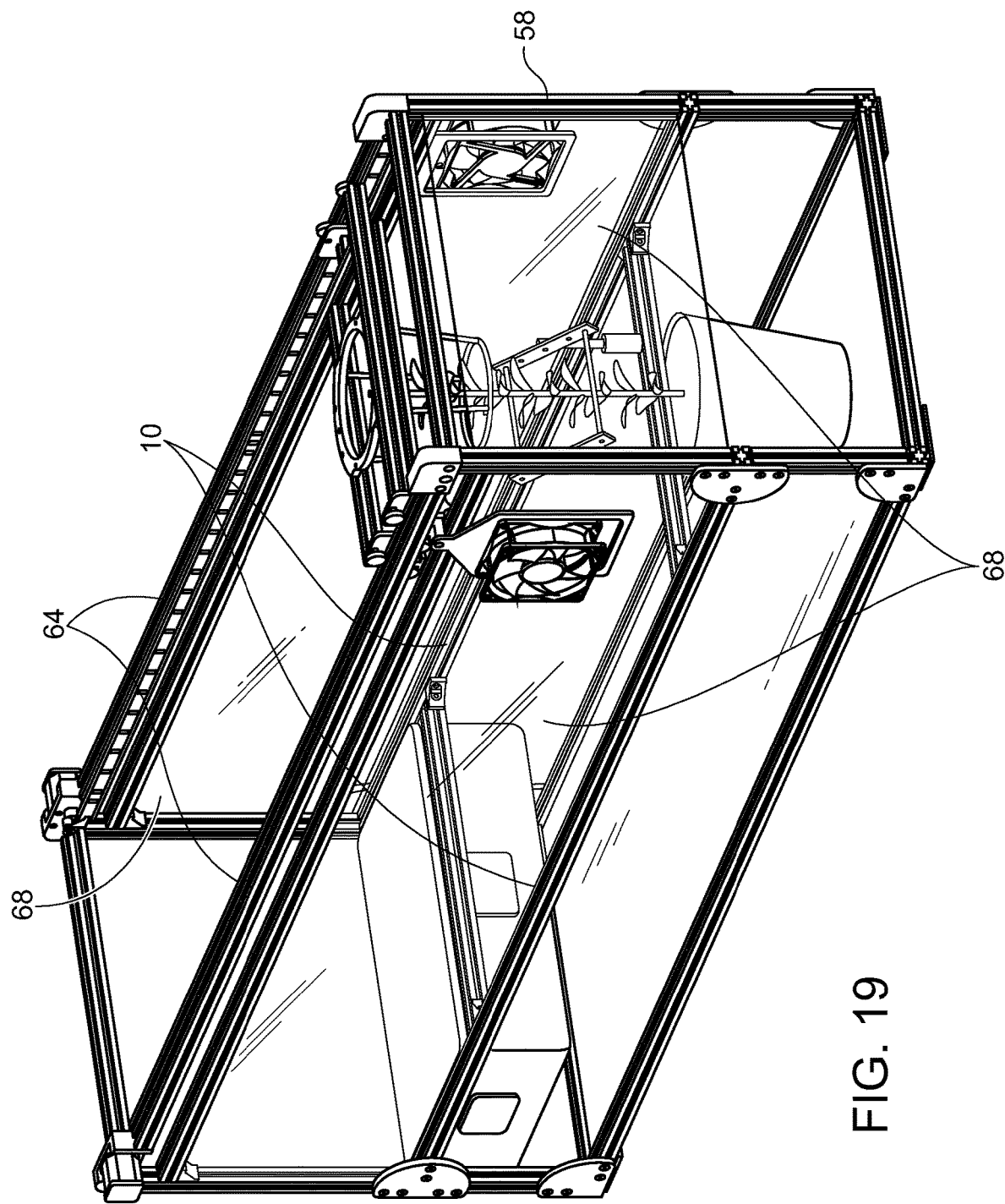
FIG. 19 is a perspective view of a fifth embodiment of an automated plant trainer, in accordance with an embodiment of the invention.
Figure 20:
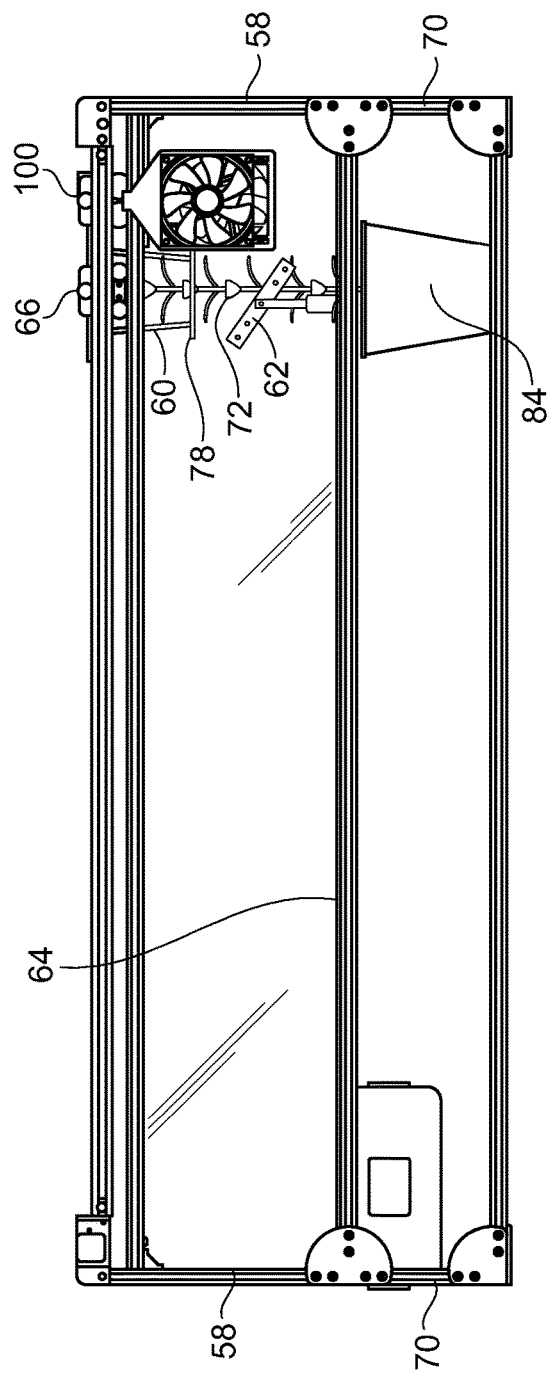
FIG. 20 is a side view of the automated plant trainer of the embodiment of FIG. 19.
Figure 21:
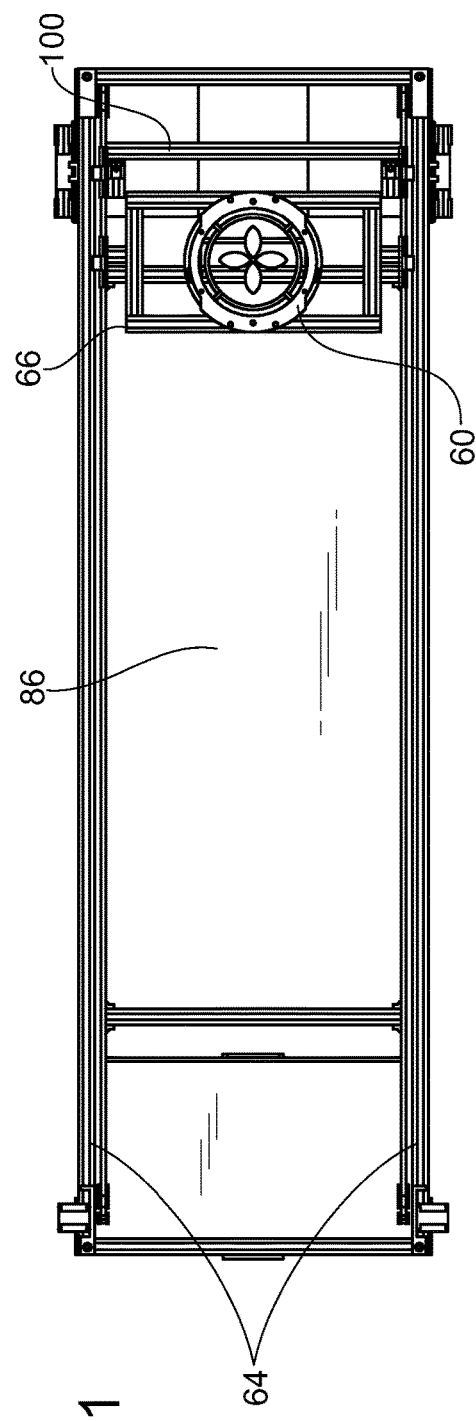
FIG. 21 is a top view of the automated plant trainer of the embodiment of FIG. 19.

FIGS. 19 through 28 and 30 illustrate another embodiment of an automated plant trainer, in accordance with an embodiment of the invention. With reference to FIGS. 19, 20 and 21, a base frame 10 is used to support one or more linear tracks 64. The linear tracks 64 are parallel to one another in a linear configuration parallel or at an angle from the base frame 10. A planar funnel support surface 66 (see FIG. 20) is suspended over the base frame 10 (see FIG. 19) and attached to one or more channel wall supports 58. The planar funnel support frame 66 (see FIG. 20) has an opening for an apex funnel 60. The apex funnel 60 has a main stem push bar 78 attached and located below the planar funnel support surface 66. A grow channel enclosure 68 (see FIG. 19), is attached to one or more channel wall supports 58 at various locations.

Figure 22:
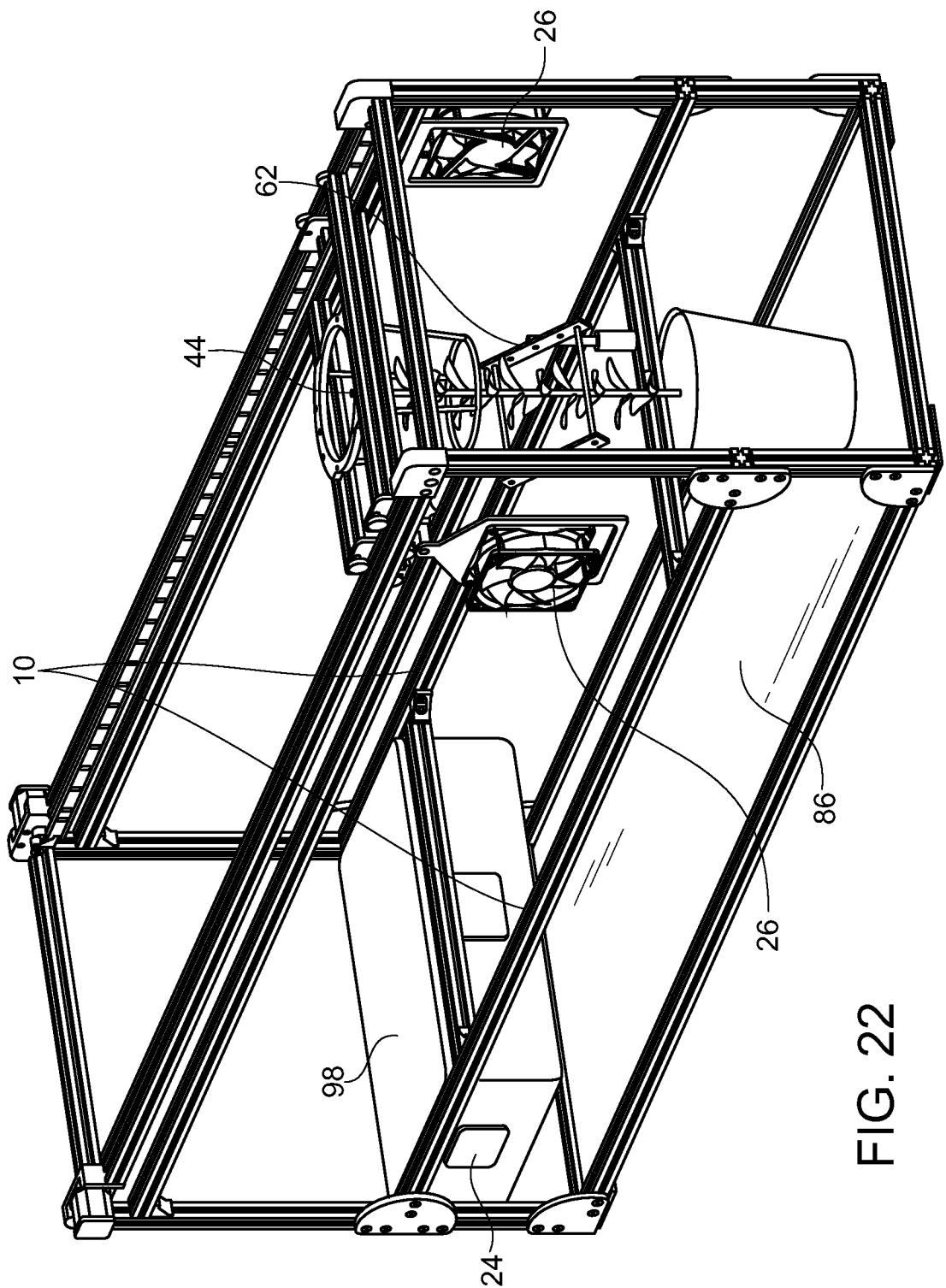
FIG. 22 is a perspective view of the base frame of the embodiment of FIG. 19.

With reference to the embodiments of FIGS. 19, 21 and 22, the base frame 10 and plant base 86 (see FIG. 22) are used as the main support for the plant. The planar funnel support surface 66 (see FIG. 21) has an opening to allow for the plant's apex to grow above the surface of the apex funnel 60. The base frame 10 is also utilized for the placement of control box 98 (see FIG. 22) and display panel 24. The base frame 10 and planar funnel support frame 66 (see FIG. 21) can, for example, be made of any sufficiently rigid and strong material with a water and mold resistant properties such as high-strength plastic, metal, and the like.

Figure 23:
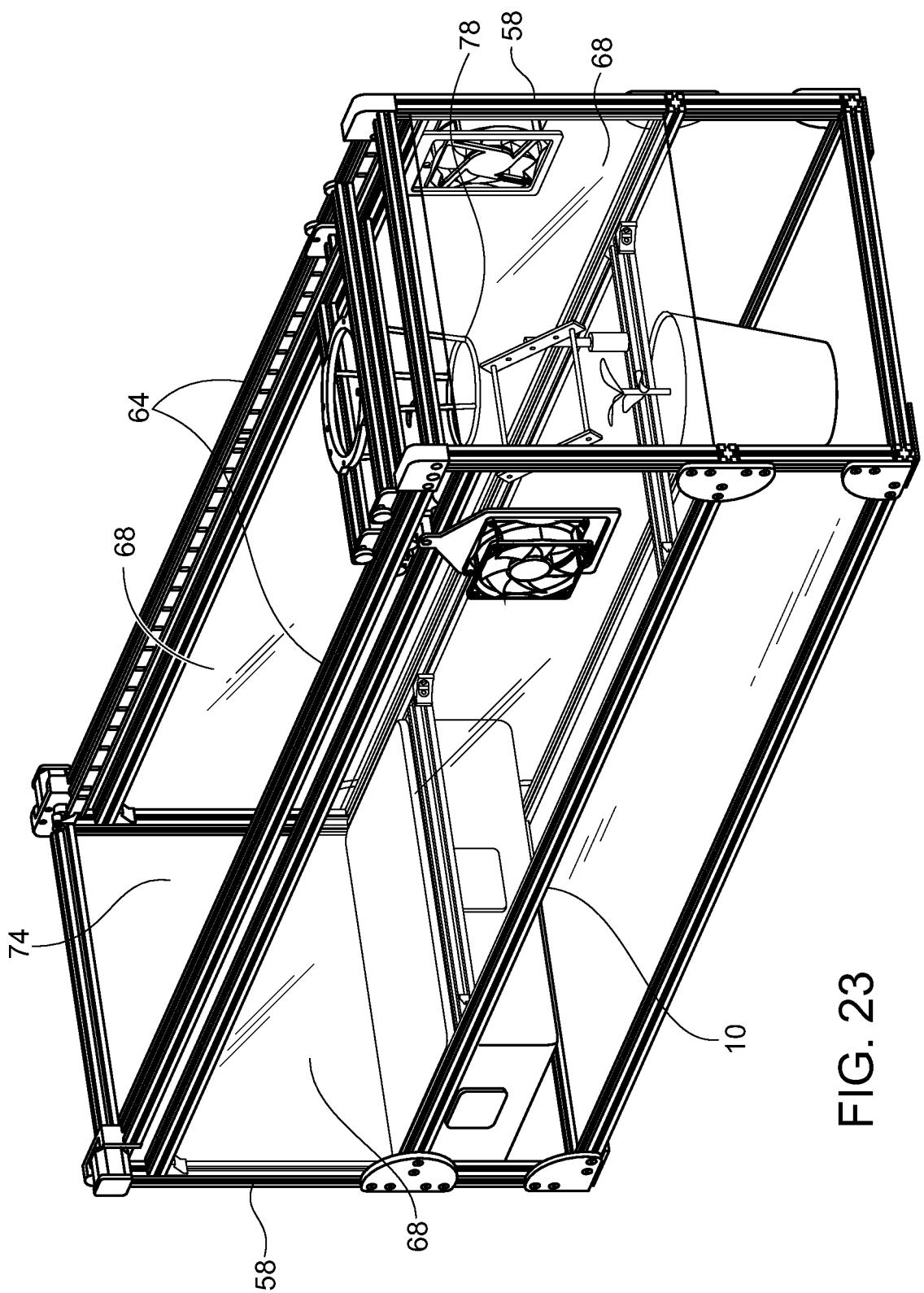
FIG. 23 is a perspective view of the foliage control components of the embodiment of FIG. 19.

With reference to the embodiment of FIG. 23, the grow channel enclosure 68 is attached to the base frame 10. The linear tracks 64 are attached to the base frame 10 and channel wall supports 58. The channel wall supports 58, base frame 10 and grow channel enclosure 68 are arranged to provide a horizontal grow volume 74 for the plant's foliage, stems and branches. The arrangement of the linear tracks 64, channel wall supports 58, and grow channel enclosure 68 can be in one or more directions to create one or more separate or continuous horizontal grow volumes within the confined footprint of base frame 10. The height of the channel wall supports can, for example, be one inch or more from the plant base 86 (see FIG. 22).

In accordance with an embodiment of the invention, a fan carriage 100 (see FIGS. 20 and 21) is attached to the linear tracks 64. One or more fans 26 (see FIG. 22) are attached to the fan carriage 100 around the perimeter of the growth channel to promote air-flow to reduce mold, humidity and the presence of insects or pests. The flow rate, timing and duration of the fans' 26 operation can, for example, be varied to simulate natural breezes and gusts. The fan carriage 100 can be moved back and forth relative to the horizontal grow volume 74 (see FIG. 23) to provide ventilation. The fan carriage 100 can, for example, be made of any sufficiently rigid and strong material with a water and mold resistant properties such as high-strength plastic, metal, and the like.

With reference to the embodiment of FIG. 23, the base frame 10 can have a rectangular shape, although it will be appreciated that other base shapes can be used, such as circular, elliptical or other shapes, in accordance with embodiments of the invention. The grow channel wall enclosures 68, are removable to allow periodic access to the plant for plant inspection and maintenance. The plant base 86 (see FIG. 22) material can, for example, be made of any sufficiently rigid and strong material with a water and mold resistant properties such as high-strength plastic, metal, and the like. The width of horizontal grow volume 74 (see FIG. 23) can, for example, be 4-inches or greater and the length can, for example, be 4 inches or greater. The grow channel enclosure 68 material can be breathable, air-permeable and made with light reduction and/or wavelength filtering capability except at apex. The apex can receive the greatest light intensity and beneficial wavelengths to promote rapid and healthy apex growth. The channel wall supports 58 can, for example, be made of any sufficiently rigid and strong material with a water resistant property such as high-strength plastic, metal, fabric, mesh and the like.

With reference to the embodiments of FIGS. 19, 21, 22, 23, 24, 26, 28 and 30, a main stem support stand 62 (see close-up view in FIG. 30) is mounted to the base frame. Additionally, a top main stem support bar 90 and a bottom main stem support bar 92 are attached to main stem support stand 62. Before the user places the plant onto the plant base, the bottom main stem support bar 92 is temporarily moved by the user. The plant is placed on the plant base and the user replaces the bottom main stem support bar 92 to its original position. As the plant grows upwards and through the apex funnel 60 (see FIG. 19), one or more apex sensors 80 (see FIG. 28) detect the presence and condition of the apex 44. When programmed conditions are detected, the apex funnel 60 and a grow channel top surface 88 (see FIG. 24) are engaged to move horizontally along the horizontal grow volume 74 (see FIG. 23). The grow channel top surface 88 (see FIG. 24) material and the planar funnel support surface 66 material can, for example, be breathable, air-permeable and made with light reduction and/or wavelength filtering capability except at apex. The apex can receive the greatest light intensity and beneficial wavelengths to promote rapid and healthy apex growth. The channel wall supports 58 (see FIG. 23) can, for example, be made of any sufficiently rigid and strong material with a water resistant property such as high-strength plastic, metal, fabric, mesh and the like. The top main stem support bar 90 (see FIG. 30) and bottom main stem support bar 92 can, for example, be made of any sufficiently rigid and strong material with a water and mold resistant properties such as high-strength plastic, metal, and the like.

Figure 28:
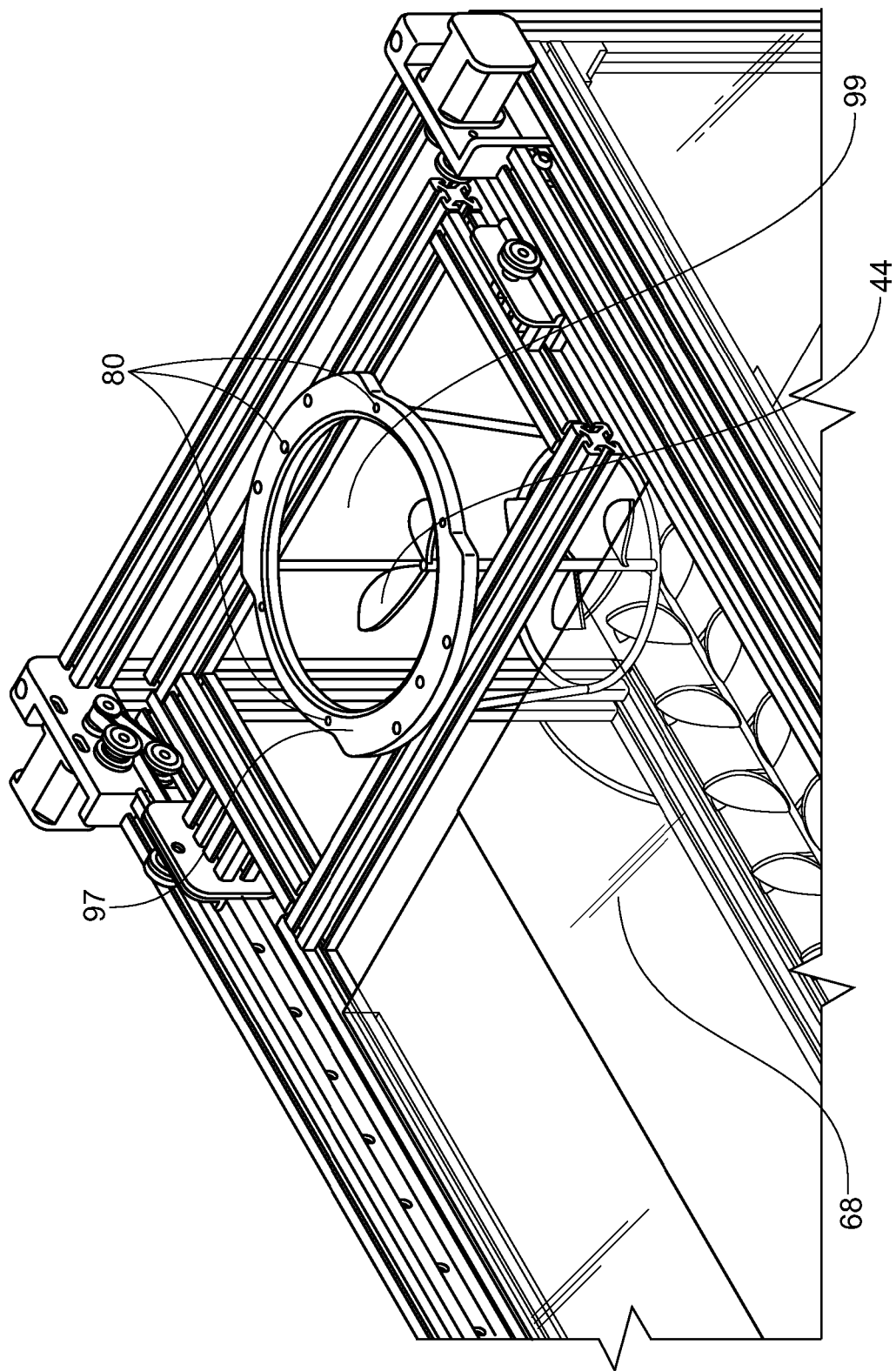
FIG. 28 is an isometric view of an apex ring and sensors of the embodiment of FIG. 19.

With reference to the embodiment of FIG. 28, an apex opening 97 includes a light opening 99 through which the apex 44 can receive light. The apex opening 97 is here shown as an apex ring 97 structure, but it will be appreciated that other apex openings 97 can be used, such as the mobile opening 22 of FIG. 1, the apex funnel 60 or any other appropriate opening for the apex 44. In the embodiment of FIG. 28, the apex opening 97 can include at least one apex sensor 80, or other sensor, mounted on the apex opening 97, so that the apex sensor moves along with the apex opening 97. The apex sensor 80 and other sensors can also be fixed in position relative to the system frame. In accordance with embodiments of the invention, the grow channel enclosure 68 surrounds the interior of the grow channel within which the plant grows, other than the light opening 99 of the apex opening 97 (although, for the sake of clarity herein, portions of the grow channel enclosure 68 are shown open to permit viewing of components inside the grow channel enclosure 68). In this way, phototropism can be used to control the growth of the plant, because the apex 44 of the plant grows in the direction of the location in which the light opening 99 is positioned. Thus, as the light opening 99 is moved, the plant grows towards the direction to which the light opening 99 is moved, and the growth of the plant can, therefore, be controlled by controlling the motion of the light opening 99. The grow channel enclosure 68 can, for example, be implemented as a set of sliding retractable blinds that withdraw and extend in length from either end of the device and/or from the side rails of the device, as the apex opening 97 moves location.

With reference to the embodiments of FIGS. 19, 20, 26, 27 and 29, the movement and travel rate of the apex funnel 60 and fan carriage 100 (see FIG. 20) can be controlled by the linear tracks 64 and a series of one or more rotary or linear motors 94 (see FIG. 27) and drive mechanism 96 (see FIG. 27) such as but not limited to belts, chains, shaft, cables and/or pulleys, which can operate either dependently or independently from one another. It will be appreciated that, rather than using motors 94, other actuators can be used in accordance with embodiments of the invention, such as air or hydraulic actuators, or using spring and/or weight actuation. With reference to the embodiment of FIG. 26, as the bottom of the apex funnel 60 moves horizontally, the main stem push bar 78 reaches the plant's main stem 72, moving the plant's main stem to bend horizontally over the top main stem support bar 90. The bottom main stem support bar 92 acts as a counter balance to hold the main stem 72 in place. As the apex continues to grow, this process repeats itself, guiding the plant main stem 72 to grow horizontally along and through the horizontal grow volume. The horizontal movement of the apex funnel 60 can be stopped after a predetermined apex default travel distance has been reached, such as when the apex funnel 60 reaches the end of the horizontal grow volume 74. The placement of the main stem push bar 78 can be varied in order to provide consistent engagement with the plant's main stem. The length of the main stem push bar 78 can be approximately equal to or less than the width of the horizontal grow volume, or can be the size of the bottom of the apex funnel 60. The shape of the main stem push bar 78 and the apex funnel 60 can vary, to reduce plant foliage and stem damage. The main stem support stand 62, the main stem push bar 78 and the apex funnel 60 can, for example, be made of any sufficiently rigid and strong material with a water-resistant property such as high-strength plastic, metal, and the like.

In an embodiment according to the invention, the base 10 (see FIG. 19) can be of a telescoping design, permitting the length of the base 10 to be adjusted manually or automatically by telescoping. For example, the long horizontal portions of base 10 can be kept telescoped inwards to a shorter length during a first phase of plant growth to keep the system's size small in the first phase. Many such systems can be stored in at least a portion of a single space (e.g., an indoor space such as a warehouse), with each base 10 telescoped inwards to a smaller size to permit more such systems to be stored in the space, for example when the plants contained in the systems are in their first phase of growth. Then, at later phases of plant growth, as the plants become longer, the systems can be moved to larger spaces, such as another portion of an indoor space such a warehouse. The base 10 can then be telescoped outwards in length, either manually or automatically, thereby allowing the plants to grow to greater size within the greater length of the base 10.

Figure 24:
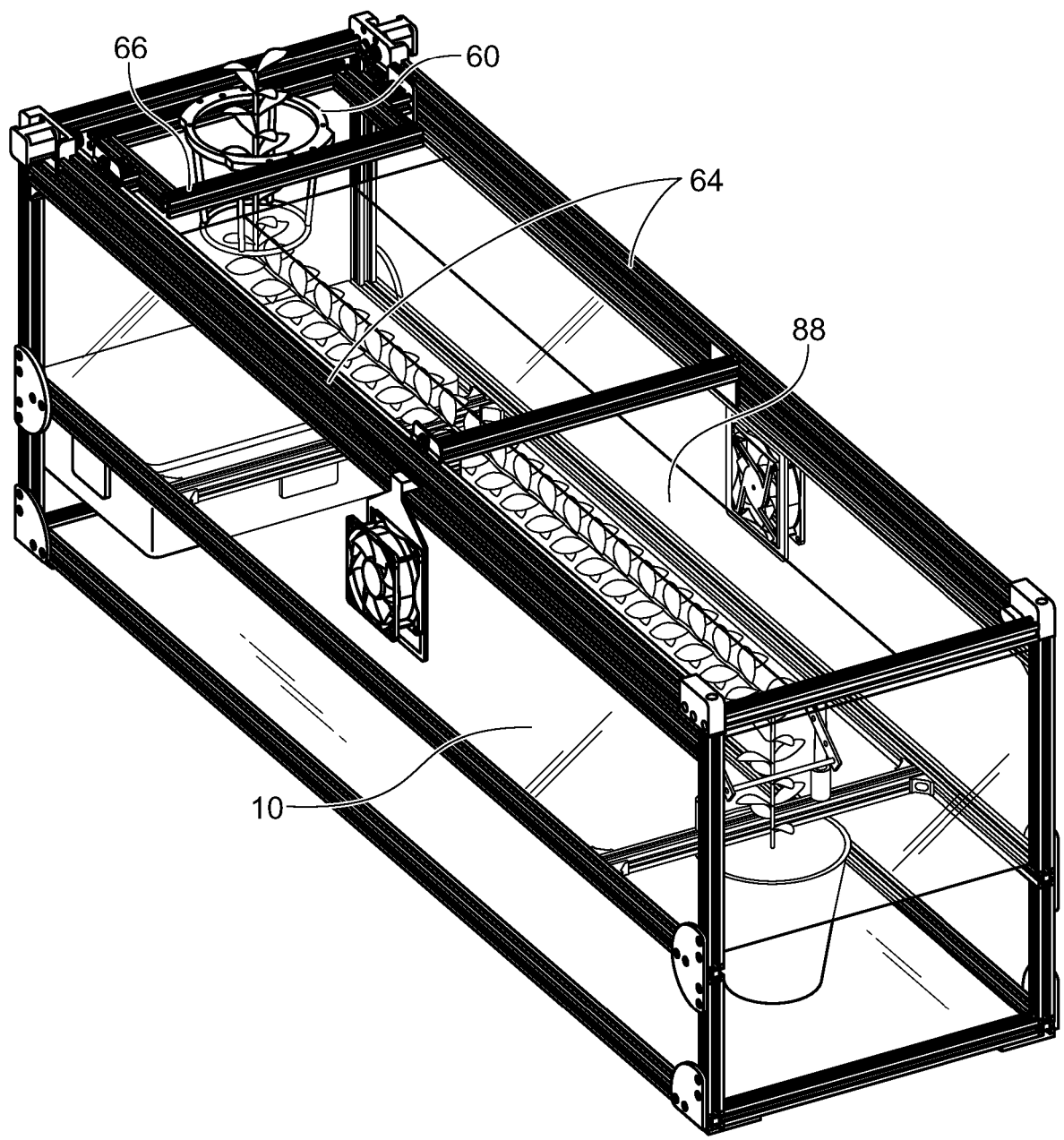
FIG. 24 is a perspective view of the embodiment of FIG. 19 at start of flowering stage.
Figure 25:
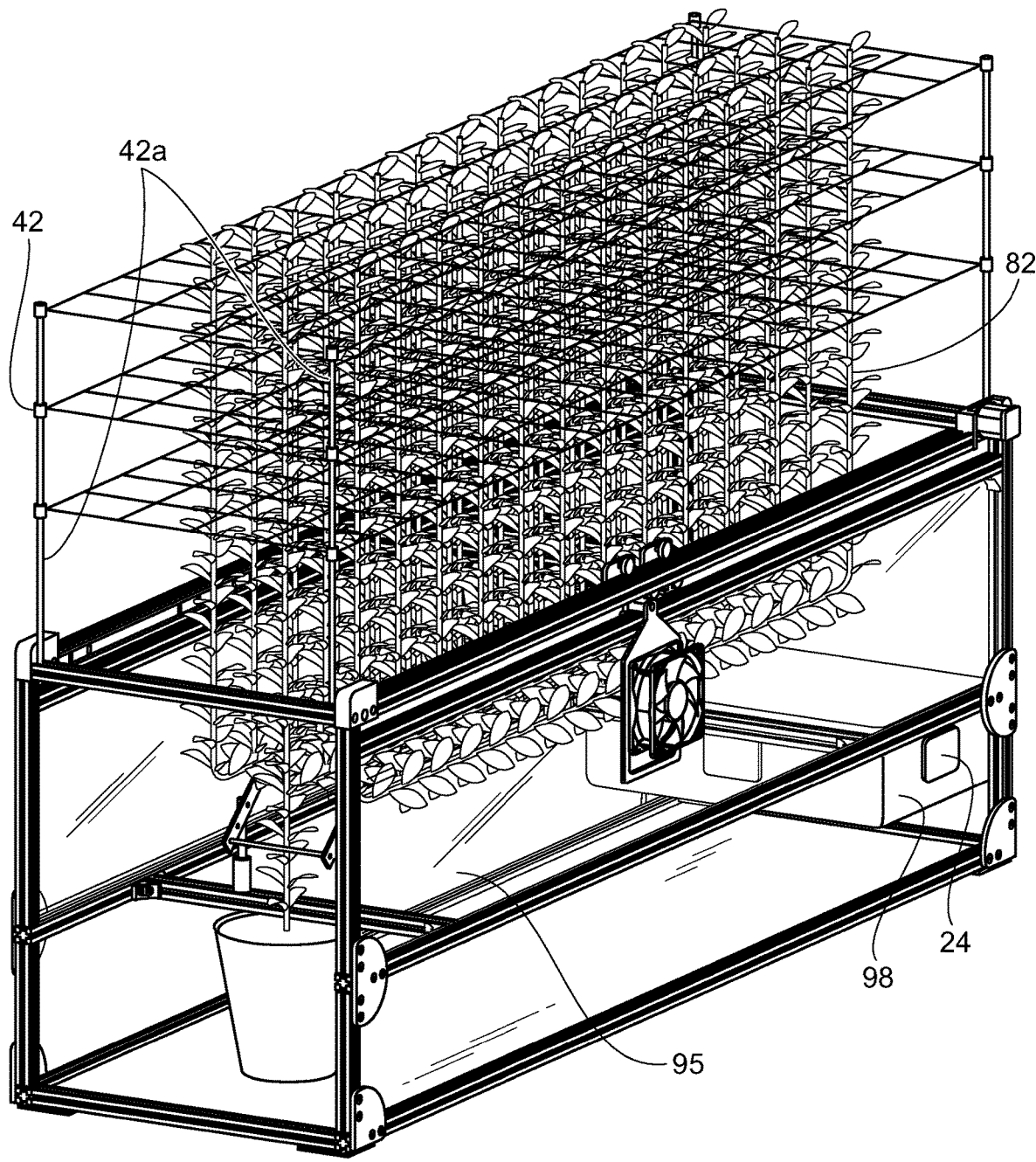
FIG. 25 is a perspective view of the flowering support components of the embodiment of FIG. 19.
Figure 26:
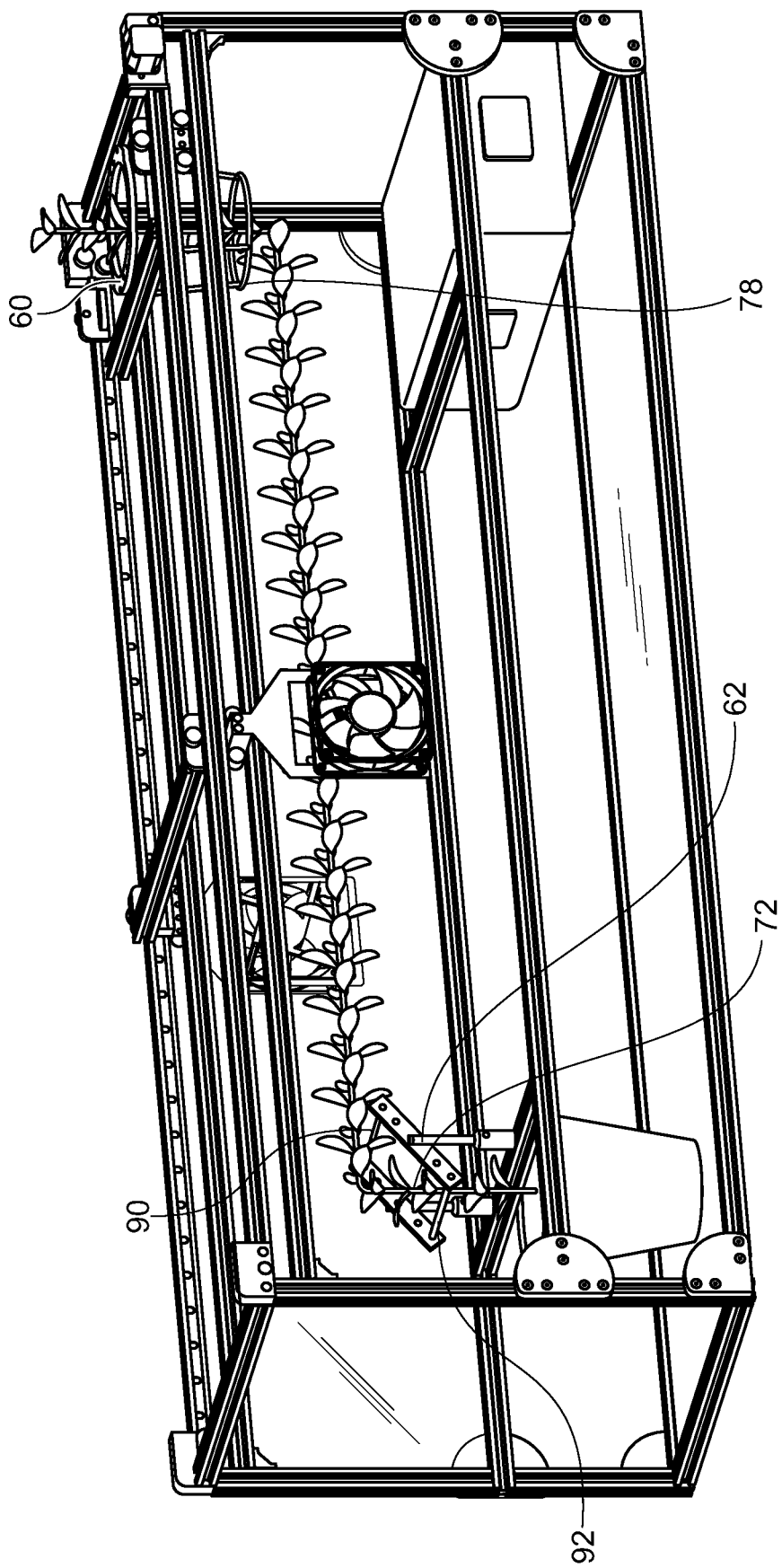
FIG. 26 is an isometric view of the stem support components of the embodiment of FIG. 19.
Figure 27:
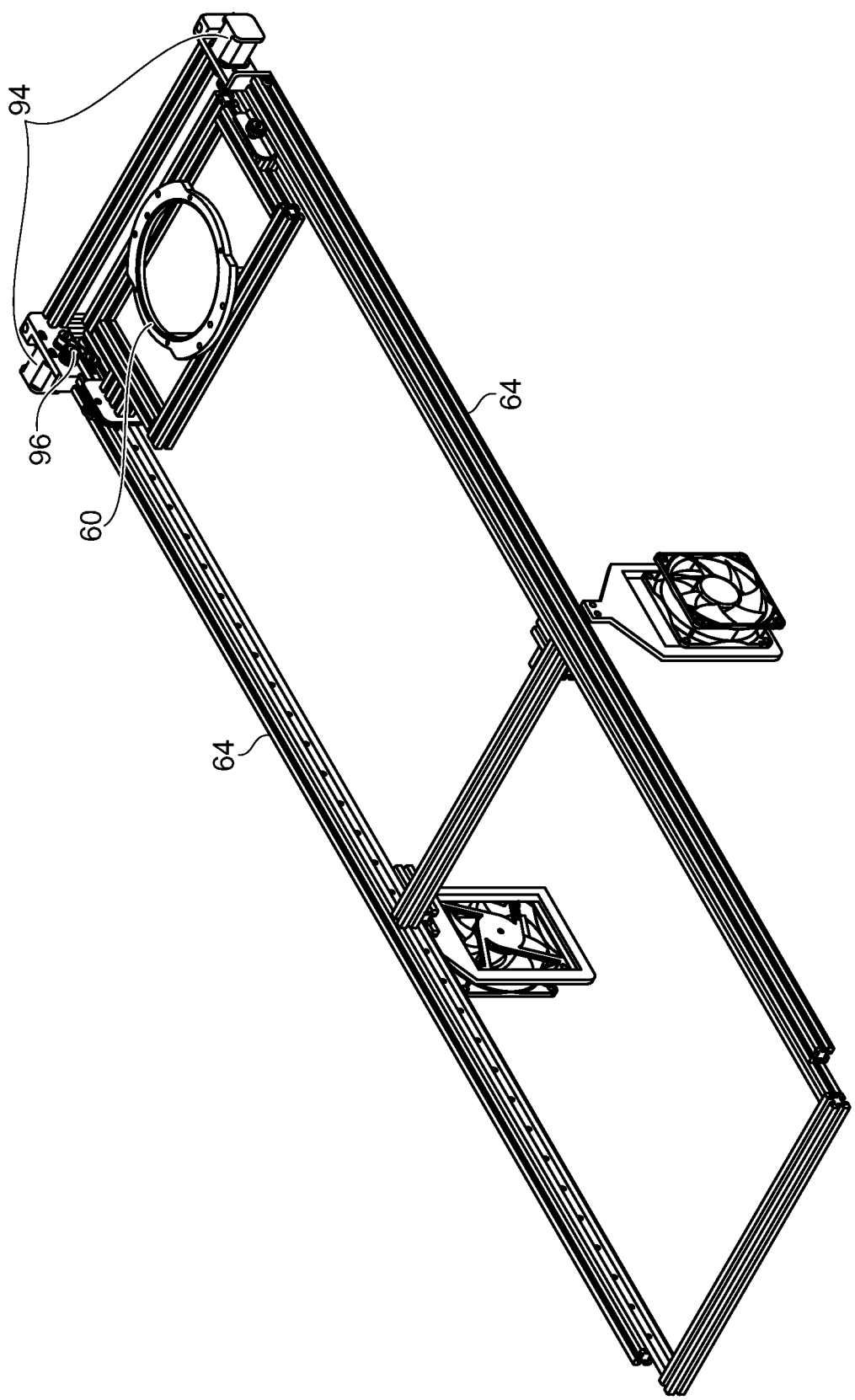
FIG. 27 is an isometric view of the motor control components of the embodiment of FIG. 19.

With reference to the embodiments of FIGS. 23, 24 and 25, once the plant reaches the end horizontal grow volume 74 (see FIG. 23), the plant is ready for the next growth stage, "flowering." At this point, depending on the plant type, strain and user inputs, the program will alert the user to switch the light cycle and plant nutrient feeding schedule to flowering conditions. The horizontal grow volume 74 will remain enclosed on top and all four sides by keeping the grow channel enclosure 68 and grow channel top surface 88 (see FIG. 24) in place, causing a delay in the plant's ability to stretch upward. After a specified amount of time, depending on the plant's stretch amount, as entered by the user, such as 24 hours or more, the grow channel top surface 88 will be opened by the user. This will create an opening along the top surface of the horizontal grow volume 74 (see FIG. 23), increasing the light intensity to the plant below in a uniform manner. The amount of time required to open the grow channel top surface 88 (see FIG. 24) can, for example, be based on the amount of time required to reduce "flowering stretch" to a minimum as determined by the program control logic. With the top of the horizontal grow volume 74 removed, as shown in FIG. 25, the plant side branches 82 can stretch towards the light allowing flower development. A flower support grid 42 (see FIG. 25) can be placed along the top of the channel wall supports for additional plant side branch 82 and flower support. The flower support grid 42 has a series of one or more gridded openings to allow the side branches and leaves to grow through the grid as they reach for the light source above. The flower support grid 42 can have a series of one or more levels to allow for branch support at varying vertical heights. At the end of the flowering stage, the flower support grid 42 can be removed for the user to interact with the plant for harvest. The flower support grid 42 can, for example, be made of any sufficiently rigid and strong material with a water-resistant property such as high-strength plastic, metal, fabric, mesh, wires, fabric and the like. In one embodiment, the flower support grid can include telescoping tubes 42a or other vertical elements (including vertical elements with square or other non-circular cross-section), which can, for example, be extended (manually or automatically) out of the lower frame of the device when the flowering stage is reached, and used to hold other flower support grid elements (such as grids at various different vertical levels); and can be telescoped downwards to be stowed within the lower frame during other stages of growth. In addition, side portions 95 and other portions of the grow channel enclosure can be fashioned for convenient access to the plant within the grow channel enclosure, for example by being attached to a removable or sliding rod at the top of the portions 95 which permits folding the portions 95 downwards (e.g., in a bunched or accordion-type arrangement) to permit access to the plants within.

With reference to the embodiments of FIG. 19, 20 and FIG. 18, the base frame 10 (see FIG. 19) is supported over a grow media container 84 (see FIG. 20) by two or more base support legs 70 (see FIG. 20). The base support legs 70 can be adjustable in height and can be used for floor support or mounted to a user provided racking system. The base support legs 70 can be with or without wheels to aid in movement and placement. The grow media container 84 can be user provided in the form of a pot, tank, reservoir or similar for use with soil, hydroponic, or aeroponic methods.

With reference to the embodiments of FIGS. 19, 20, 22, 23, 25 and 28, to automatically control the device one or more of the following sensors (such as all of the following sensors) can be included: (i) One or more apex sensors 80 (see FIG. 28) to detect the presence of apex foliage at the apex funnel 60 (see FIG. 20). The apex sensor can also detect the apex distance above the apex funnel 60 or the flower support grid 42 (see FIG. 25). (ii) One or more light intensity sensors to measure the light intensity at the apex location and within the horizontal grow volume 74 (see FIG. 23). (iii) One or more carbon dioxide sensors to detect the level of available carbon dioxide in the horizontal grow volume 74. (iv) One or more air flow sensors to detect the movement of air in the horizontal grow volume 74. (v) One or more humidity sensors to detect the level of humidity in the air within the horizontal grow volume 74. (vi) One or more temperature sensors to detect the temperature of the air within the horizontal grow volume 74. An embodiment according to the invention can also be implemented without any of the foregoing sensors, for example, using mechanical sensing or control techniques; or can include only the apex sensor 80 (see FIG. 28). Additionally, the device can monitor the length of the plant's main stem by tracking the distance of travel of the apex within the horizontal grow volume 74 (see FIG. 23). Additionally, the control logic can, for example, control a light power switch which can be used to automatically control user provided lights based on the location of the light and the plant's main stem location. The sensors can, for example, provide one-time or continuous output readings to a processor which can provide output data to the display panel 24 (see FIG. 22) for the user. The display panel 24 can also include a power on/off switch, and the user can also, for example, modify the device's automation based on plant type, desired stem length, and time duration for vegetation and flowering stages through control panel input.

The user can, for example, connect to the device via wired, wireless, Wi-Fi or Bluetooth connection. This can allow the user to monitor the device from a remote location or a third-party control management system. In one embodiment, remote monitoring and control of the device can, for example, be performed using a software application ("App") implemented on a mobile or other computing device. The device can, for example, be powered by a combination of solar and/or external power supplies. The devices can also be daisy-chained to one another to provide power to multiple devices through one or more power connections.

The advantages of the embodiment of FIGS. 19-28 and 30, include without limitation, that it is portable, and narrow enough to be placed in close proximity to another, similar, device within a typical rack arrangement.

In accordance with an embodiment of the invention, a time between a light switch date and a remove top date can be optimized depending on a strain or plant type to reduce "flowering stretch" of the plant. In this embodiment, the light switch date may be performed automatically, as well as the opening of the top, in accordance with a desired time between light switch and opening of the top. Results of a growth trial experiment are summarized in the below Table 1.

TABLE 1

Growth Trial Experiment Results

| Plant Description: | Plant 1 (Short) | Plant 2 (Taller) |
| --- | --- | --- |
| Wet Weight (lbs) - Whole | 6 | 6.4 |
| Wet Weight (lbs) - Good | 0.8 | 1.8 |
| Wet Weight (lbs) - Waste | 5.2 | 4.6 |
| Start Date | Feb. 14, 2017 | Feb. 14, 2017 |
| Light Switch Date | May 14, 2017 | May 14, 2017 |
| Remove Top Date | Jun. 6, 2017 | May 31, 2017 |
| Harvest Date | Aug. 19, 2017 | Aug. 19, 2017 |
| Total Veg Days | 89 | 89 |
| Total Flower Days | 97 | 97 |
| Flower Constrain Days | 23 | 17 |
| Total Grow Days | 186 | 186 |
| Stem Length (in.) | 40.5 | 40 |
| Stem Growth Rate (in./day) | 0.46 | 0.45 |
| Total Vertical Height (in.) | 16 | 24 |

In the growth trial summarized in the above Table 1, in accordance with an embodiment of the invention, there was a delay in the date of the removal of the top for Plant 1 versus Plant 2. Plant 1 was delayed 23 days (from light switch) with 16 inches total height. Plant 2 was delayed 17 days with 24 inches total height. The conclusion was that longer flower constraint time reduces total vertical height. The optimal constraint time can vary, depending on the strain and plant type, in order to reduce flowering stretch.

In a method of plant training in accordance with an embodiment of the invention, a plant is grown under first light conditions during a growth phase, while constraining vertical growth of the plant. The light conditions of the plant are then altered to second light conditions at a light switch time while continuing to constrain the vertical growth of the plant. Subsequently, constraints on vertical growth of the plant are removed, after the light switch time. Such a method can be performed using any of the features of an automated plant training system taught herein. The altering the light conditions and the removing constraints on the vertical growth of the plant can be performed automatically. A time between the light switch time and the removing constraints on the vertical growth of the plant can be controlled using electronic control signals based on at least one of a strain of the plant or a type of the plant.

As used herein, an "apex" of a plant is the head or leading growth tip of the plant.

As used herein, "light" can include natural sunlight or artificial light of any kind.

As used herein, a "main stem" is the main trunk of a plant to which the plant's branches, leaves and apex are attached.

As used herein, "phototropism" is the growth of a plant in response to light stimulus, either towards the light stimulus (positive phototropism) or away from the light stimulus (negative phototropism).

In accordance with embodiments of the invention, plants that can be grown in the automated plant training system can, for example, include fruit bearing plants, flowering plants, vines, and other types of plants; and can, for example, include plants that naturally grow (in the absence of being constrained to grow horizontally) to be taller than two feet in height, such as taller than four feet, six feet, eight feet, ten feet, twelve feet, fourteen feet, sixteen feet, eighteen feet and twenty feet in height; such as, for example, between about two feet and about twenty feet in height. In addition to linear and other growth patterns shown herein, it will be appreciated that, in accordance with embodiments of the invention, the trajectory of the plant's growth can be made into any of a variety of different growth patterns, such as to form an aesthetically pleasing plant growth pattern within the grow channel enclosure.

As used herein, a "drive mechanism" can, for example, include at least one wall support of the grow channel enclosure, at least one track in which the at least one wall support is engaged, and motors, other actuators (such as air actuators, hydraulic actuators, spring and/or weight actuators), belts, chains, shaft, cables and/or pulleys, which can operate either dependently or independently from one another, and any other mechanical and electrical components that cooperate together, directly or indirectly, to cause the apex opening to be moved in a direction of a predetermined growth path under control of at least one of: (i) a predetermined growth control signal, and (ii) a sensed growth control signal produced based on a sensed presence of a plant growing in the interior of the grow channel enclosure, or any other control signals taught herein.

As used herein, unless otherwise specified, it should be appreciated that a "control signal" can be mechanical, electrical, or a combination of the two. For a mechanical control signal, for example, a system of mechanical linkages can be used to cause movement or other change of an apex opening or other component set forth herein. For electrical control signals, it should be appreciated that various electronic circuits and microprocessors can be used to implement the control techniques and signals.

Figure 29:
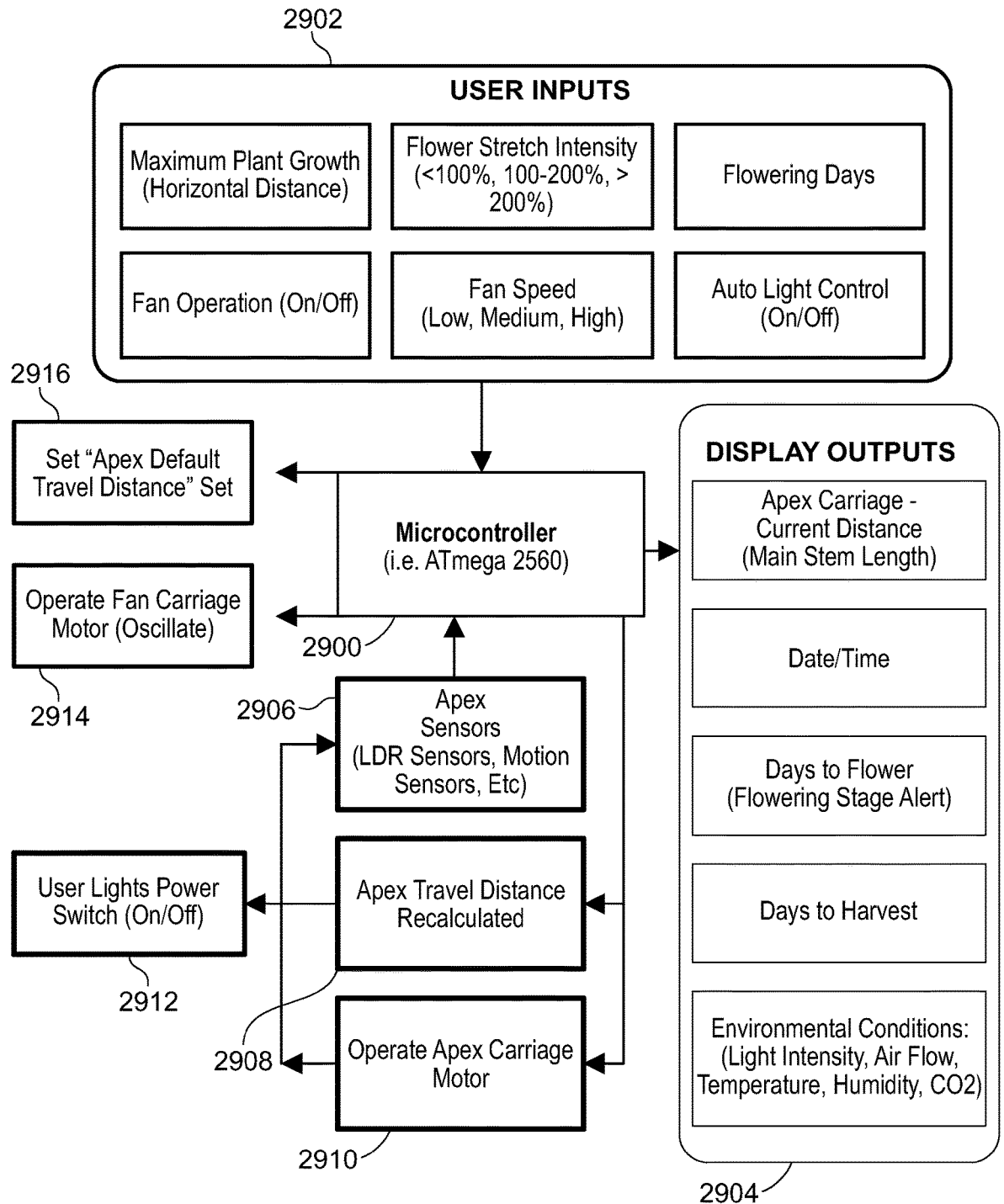
FIG. 29 is a schematic block diagram of control logic of an automated plant trainer in accordance with an embodiment of the invention.
Figure 30:
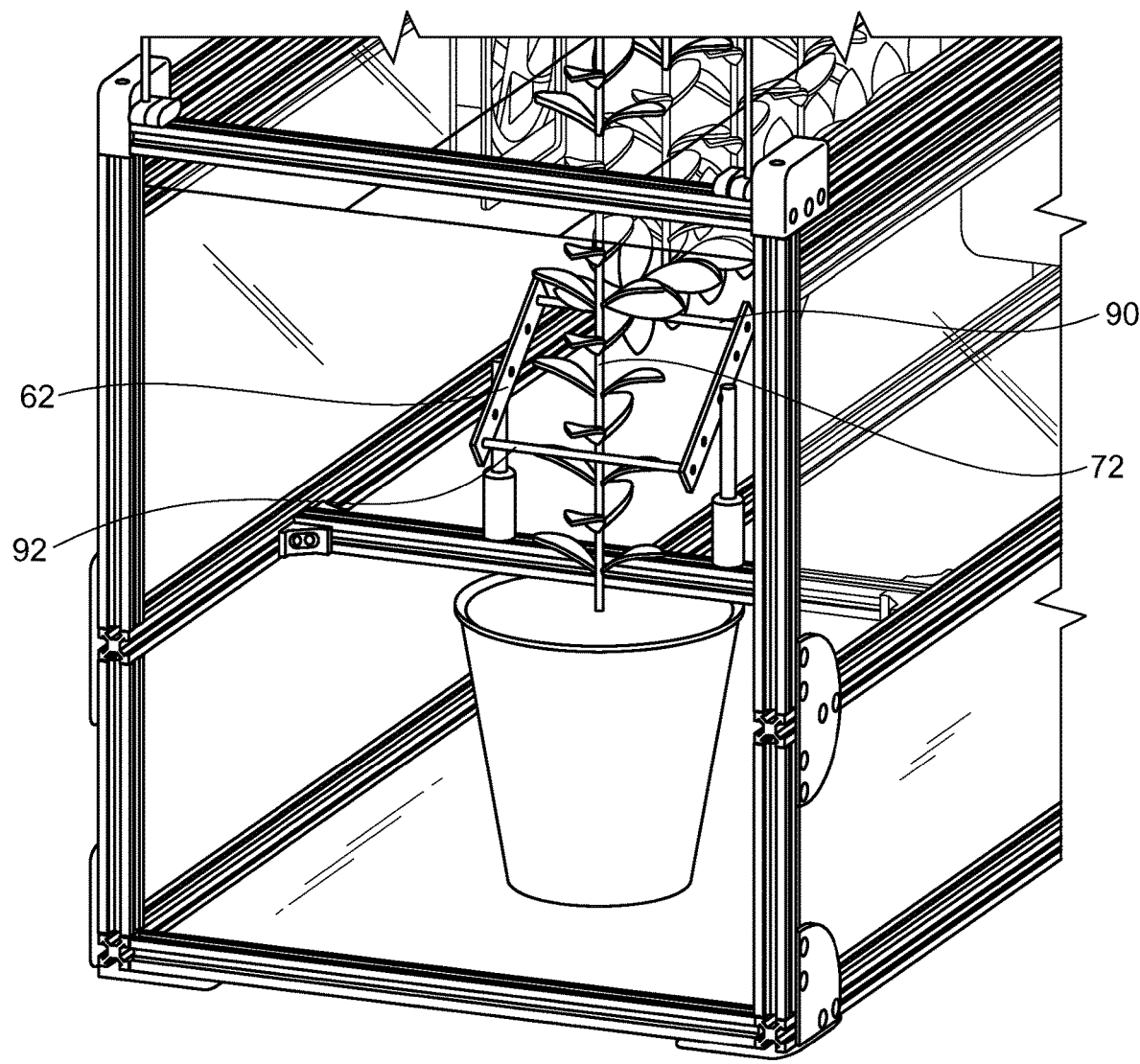
FIG. 30 is a view of the main stem support stand and related components of the embodiment of FIG. 19, in accordance with an embodiment of the invention.

FIG. 29 is a schematic block diagram of control logic of an automated plant trainer in accordance with an embodiment of the invention. The control logic can, for example, be implemented by one or more microcontrollers 2900, which can, for example without limitation, an ATmega 2560 microcontroller, sold by Atmel Corporation of San Jose, Calif., U.S.A. Programming of the microcontroller 2900 can, for example, be performed using Arduino software, sold by the Arduino open source software company, project and open source community; or another other programming language or technique. The microcontroller 2900 can, for example, be positioned within control box 98 (see FIG. 22). Input from a user, and display output to the user, can be performed via control panel 24 (see FIG. 22). As shown in FIG. 29, user inputs 2902 can include maximum plant growth (or horizontal distance), flower stretch intensity (such as less than 100%, between 100% and 200%, and greater than 200%), flowering days, fan operation (such as on/off), fan speed (such as low, medium and high) and automatic light control (such as on/off). Other inputs can, for example, include power on/off, plant type (vine versus plant), desired plant height, ventilation control, duration of vegetative and flowering stages, desired carbon dioxide and humidity levels, Wi-Fi and Bluetooth connection settings, and others. The display outputs 2904 can, for example, include: apex carriage—current distance (that is, the main stem length); the date/time; the days to flower (including, for example, a flowering stage alert); days to harvest; and one or more environmental conditions (such as light intensity, air flow, temperature, humidity and carbon dioxide levels). Other outputs can, for example, include a power indicator, a Wi-Fi or Bluetooth connection, plant height (stem length), and light intensity at the apex as against the growth channel. The microcontroller 2900 can receive input from the user inputs 2902, and from sensors such as apex sensors 2906, which can, for example, be one or more of: Light Dependent Resistor (LDR) sensors; motion sensors; an Infrared sensor to monitor breaking of a beam or plane of light; an ultrasonic sensor, optical camera or color sensor, to monitor obstacle distance; an optical camera to monitor plant movement. The sensors 2906, such as apex sensor, can be located to move with the apex of the plant, for example by being mounted on the apex funnel, or in a fixed position, such as at the end of the apex channel. The microcontroller 2900 can provide outputs and control to: the display outputs 2904 (such as via control panel 24 of FIG. 22); perform a recalculation of the apex travel distance 2908; operate the apex carriage motor 2910; turn the user lights power switch on or off 2912; operate the fan carriage motor 2914 (for example, to oscillate the fan carriage); set the apex default travel distance 2916; and perform other processing and transmitting of sensing, control, actuation and other signals in accordance with techniques taught herein.

Figure 31:
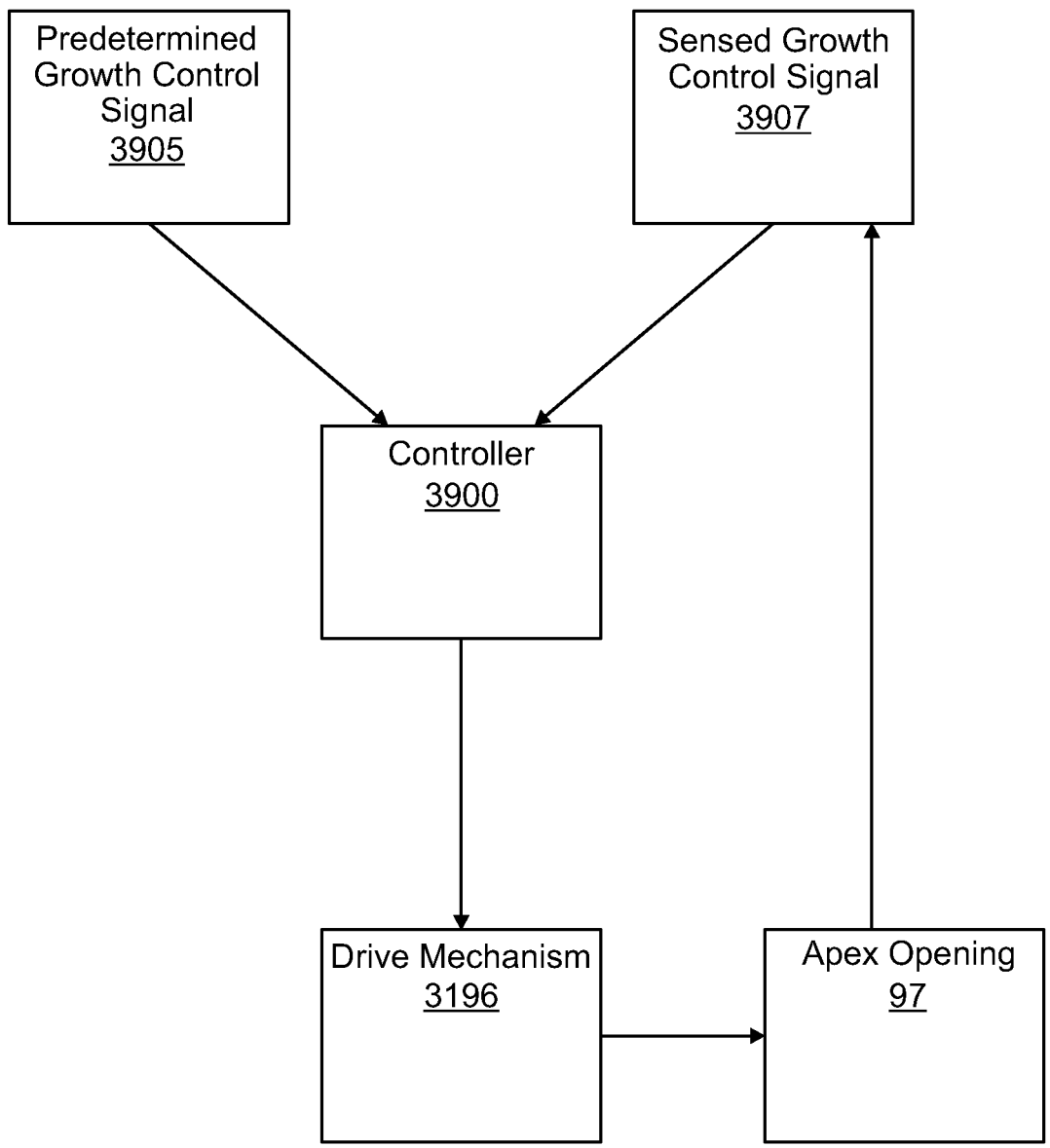
FIG. 31 is a schematic block diagram of a control technique implemented in accordance with an embodiment of the invention.

FIG. 31 is a schematic block diagram of a control technique implemented in accordance with an embodiment of the invention. A controller 3900, which can, for example, be a microcontroller 2900 (see FIG. 29) or a mechanical or electromechanical control mechanism, receives one or more of: (i) a predetermined growth control signal 3905 and (ii) a sensed growth control signal 3907 produced based on a sensed presence of a plant growing in the interior of the grow channel enclosure 68 (see FIG. 28). For example, the predetermined growth control signal 3905 can be received via user input 2902 (see FIG. 29) using control panel 24 (see FIG. 22). The predetermined growth control signal 3905 (see FIG. 31) can, for example, indicate activation of a default, constant rate of growth, or another predetermined rate or desired time function of growth. The sensed growth control signal 3907 (see FIG. 31) can, for example, be received from a sensor, such as apex sensor 2906 (see FIG. 29), for example to indicate that the plant's apex has grown past or over a sensor 80 (see FIG. 28) or through a detection area of the sensor 80. In response to one or more of the predetermined growth control signal 3905 and the sensed growth control signal 3907, the controller 3900 (such as microcontroller 2900 of FIG. 29) actuates the drive mechanism 3196 (such as drive mechanism 96 of FIG. 27) to cause the apex opening 97 (see FIG. 28) to be moved in a direction of a predetermined growth path under control of the signals 3905 and/or 3907. For example, the controller 3900 can operate the apex carriage motor 94 (see FIG. 27) as at 2910 (see FIG. 29), to move the apex opening 97 (see also FIG.

28) down the track 64 of the system in a desired direction of the grow channel, such as by using microcontroller 2900 to actuate the apex carriage motor 94, or any other form of actuator. Because of the movement of the apex opening 97, the plant grows in the desired direction as a result of phototropism, which can result in a change in the sensed growth control signal 3907. This can enable control of growth of the plant to be, at least in part, closed loop control, although it will be appreciated that embodiments can also combine open loop control and closed loop control. In one embodiment, growth of the plant can be started using a predetermined growth control signal 3905, such as at a fixed rate, which can then be replaced, or supplemented, by additional actuation based on the sensed growth control signal 3907. In one embodiment, after an initial period of using only a predetermined fixed rate of growth, the system subsequently supplements that predetermined fixed rate based on the sensed growth control signal 3907. A predetermined distance per time pattern signaled by the predetermined growth control signal 3905 can, for example, comprise a distance per day of between about 0.1 inch per day and about 12 inches per day; such as between about 0.1 inches per day to about 2.1 inches per day, such as between about 0.5 inches per day to about 1 inch per day, and further such as between about 0.75 inches per day to about 1 inch per day. In addition, it will be appreciated that, although electronic control techniques are described, the controller 3900 can also be implemented using mechanical techniques, or combined electrical and mechanical techniques. Signals can, for example, include simpler interactions than electrical control signals, for example by using mechanical interactions of mechanical components such as springs, hydraulics and air-based systems. In one example, a sensed signal can include the plant pushing against a sensor, such as a switch that senses its growth.

In an embodiment according to the invention, electronic control processors (such as microcontroller 2900) can be used to implement control techniques, such as shown in FIGS. 29 and 31. Such techniques can be implemented by one processor or may be implemented by component processors configured to perform the described processes, for example within control box 98 (see FIG. 22). Such component processors may be implemented on a single machine, on multiple different machines, in a distributed fashion in a network, or as program module components implemented on any of the foregoing. Such processors can, for example, include processors that can perform one or more of the following: provision of one-time or continuous input or output communications to and from sensors; provision of input or output communications with the control panel 24 or another form of user interface such as a web portal or application; processing to permit the user to modify the device's automation based on plant type, desired stem length, and time duration for vegetation and flowering stages through control panel input; connection to the device via, for example, wired, wireless, Wi-Fi or Bluetooth connection; permitting the user to monitor the device from a remote location or a third-party control management system; controlling powering of the device, for example via a combination of solar and external power supplies; at least a portion of the stem control, foliage control, apex control; and censors and controls management. In one embodiment, remote monitoring and control of the device can, for example, be performed using a software application ("App") implemented on a mobile or other computing device.

A computer network or similar digital processing environment can be used to implement portions of embodiments of the present invention, such as the foregoing. Client computer(s)/devices and server computer(s) can provide processing, storage, and input/output devices executing application programs and the like. The client computer(s)/devices can also be linked through a communications network to other computing devices, including other client devices/processes and server computer(s). The communications network can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

For control interfaces, client processor/devices or server computers, such systems can be implemented as follows. Each computer can contain a system bus, where a bus is a set of hardware lines used for data transfer among the components of a computer or processing system. The system bus is essentially a shared conduit that connects different elements of a computer system (e.g., processor, disk storage, memory, input/output ports, network ports, etc.) that enables the transfer of information between the elements. Attached to the system bus is an I/O device interface for connecting various input and output devices (e.g., keyboard, mouse, displays, printers, speakers, etc.) to the computer. A network interface allows the computer to connect to various other devices attached to a network. Memory provides volatile storage for computer software instructions and data used to implement an embodiment of the present invention (e.g., to implement processing and storage for the predetermined growth control signal, the sensed growth control signal, and any other control and power signals and automation techniques taught herein). Disk storage provides non-volatile storage for computer software instructions and data used to implement portions of an embodiment of the present invention. A central processor unit is also attached to the system bus and provides for the execution of computer instructions.

In one embodiment, the processor routines and data are a computer program product, including a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

While example embodiments have been particularly shown and described, it will be understood by those skilled in the art that various changes in form and details may be made therein without departing from the scope of the embodiments encompassed by the appended claims.

What is claimed is:

1. An automated plant training system, the system comprising:
   an apex opening comprising a light opening;
   a grow channel enclosure surrounding at least a portion of an interior of the grow channel enclosure other than a portion comprising the light opening of the apex opening;
   a controller adapted to receive at least one of: (i) a predetermined growth control signal, and (ii) a sensed growth control signal produced based on a sensed presence of a plant growing in the interior of the grow channel enclosure; and
   a drive mechanism adapted to produce horizontal relative motion between the apex opening and a stationary base of the plant in a direction of a predetermined growth path under control of at least one of: (i) the predetermined growth control signal, and (ii) the sensed growth control signal;
   the controller being further adapted to cause the drive mechanism to produce the horizontal relative motion between the apex opening and the base of the plant such that (i) light is transmitted through the light opening to an apex of the plant as the plant grows, and such that (ii) the direction of growth of the plant is controlled based on the horizontal relative motion between the apex opening and the base of the plant.

2. The automated plant training system of claim 1, wherein the drive mechanism is coupled to at least a motor adapted to move at least a portion of the drive mechanism in response to at least one of: (i) the predetermined growth control signal, and (ii) the sensed growth control signal.

3. The automated plant training system of claim 1, further comprising an apex sensor adapted to detect at least one of a height, presence and condition of the apex of the plant.

4. The automated plant training system of claim 1, wherein the drive mechanism comprises at least one of: at least one wall support of the grow channel enclosure, the apex opening, and at least one main stem push bar.

5. The automated plant training system of claim 4, wherein the drive mechanism comprises at least one wall support of the grow channel enclosure, and further comprising at least one track in which the at least one wall support is engaged.

6. The automated plant training system of claim 5, wherein the at least one track extends in a substantially linear horizontal grow path.

7. The automated plant training system of claim 5, wherein the at least one track extends in at least one of: a spiral grow path, a U-shaped grow path, and an elliptical grow path.

8. The automated plant training system of claim 5, wherein the at least one wall support comprises a channel wall support flexible joint adapted to permit at least a portion of the at least one wall support to swing away from the interior of the grow channel enclosure to allow access to the plant.

9. The automated plant training system of claim 1, wherein the drive mechanism is adapted to move the apex opening in a direction of the predetermined growth path under control of at least the predetermined growth control signal, the predetermined growth control signal being adapted to signal the drive mechanism to move the apex opening based on a predetermined distance per time pattern.

10. The automated plant training system of claim 9, wherein the predetermined distance per time pattern comprises a distance per day of between 0.1 inch per day and 12 inches per day.

11. The automated plant training system of claim 10, wherein the distance per day comprises between 0.1 inches per day and 2.1 inches per day.

12. The automated plant training system of claim 1, wherein the base is adapted to support the plant, the base comprising an opening adapted to permit the apex of the plant to grow above a surface of the base.

13. The automated plant training system of claim 12, further comprising a main stem support stand mounted to the base.

14. The automated plant training system of claim 13, further comprising a main stem push bar adapted to force the plant to bend horizontally over the main support stand.

15. The automated plant training system of claim 1, further comprising at least one fan, blower or opening adapted to move air through or into at least a portion of the interior of the grow channel enclosure.

16. The automated plant training system of claim 15, comprising at least one fan, the at least one fan being adapted to move relative to the grow channel enclosure.

17. The automated plant training system of claim 1, wherein the grow channel enclosure is adapted to at least one of (i) attenuate an intensity of light passing from an exterior to the interior of the grow channel enclosure and (ii) filter at least one wavelength range of light passing from the exterior to the interior of the grow channel enclosure, in portions of a three-dimensional space surrounding the interior of the grow channel enclosure other than the portion comprising the light opening of the apex opening.

18. The automated plant training system of claim 1, wherein a material of the grow channel enclosure is air-permeable.

19. The automated plant training system of claim 1, further comprising more than one of the automated plant training system in a vertically stacked or tiered arrangement.

20. The automated plant training system of claim 1, wherein the apex opening comprises an apex funnel, at least a portion of which forms the light opening of the apex opening.

21. The automated plant training system of claim 1, wherein at least one of the predetermined growth control signal and the sensed growth control signal comprises a mechanical control signal.

22. The automated plant training system of claim 1, wherein at least one of the predetermined growth control signal and the sensed growth control signal comprises an electrical control signal.

23. A method of plant training, the method comprising:
   growing a plant under first light conditions during a growth phase, while constraining vertical growth of the plant;
   altering light conditions of the plant to second light conditions at a light switch time while continuing to constrain the vertical growth of the plant;
   subsequently removing constraints on vertical growth of the plant, after the light switch time,
   wherein the method of plant training is performed using an automated plant training system comprising:
      an apex opening comprising a light opening;

a grow channel enclosure surrounding at least a portion of an interior of the grow channel enclosure other than a portion comprising the light opening of the apex opening;

a controller adapted to receive at least one of: (i) a predetermined growth control signal, and (ii) a sensed growth control signal produced based on a sensed presence of a plant growing in the interior of the grow channel enclosure; and a drive mechanism adapted to produce horizontal relative motion between the apex opening and a stationary base of the plant in a direction of a predetermined growth path under control of at least one of: (i) the predetermined growth control signal, and (ii) the sensed growth control signal;

the controller being further adapted to cause the drive mechanism to produce the horizontal relative motion between the apex opening and the base of the plant such that (i) light is transmitted through the light opening to an apex of the plant as the plant grows, and such that (ii) the direction of growth of the plant is controlled based on the horizontal relative motion between the apex opening and the base of the plant.

24. The method of claim 23, wherein the altering the light conditions and the removing constraints on the vertical growth of the plant are performed automatically.

25. The method of claim 24, wherein a time between the light switch time and the removing constraints on the vertical growth of the plant is controlled using electronic control signals based on at least one of a strain of the plant or a type of the plant.

* * * * *